(12) United States Patent
Ogura

(10) Patent No.: US 8,466,928 B2
(45) Date of Patent: Jun. 18, 2013

(54) IMAGE PROCESSING APPARATUS AND METHOD

(75) Inventor: Keigo Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1148 days.

(21) Appl. No.: 11/782,208

(22) Filed: Jul. 24, 2007

(65) Prior Publication Data
US 2008/0084425 A1 Apr. 10, 2008

(30) Foreign Application Priority Data
Oct. 6, 2006 (JP) ................................ 2006-275730

(51) Int. Cl.
*G06F 12/06* (2006.01)
*G06F 12/00* (2006.01)
*G06F 13/28* (2006.01)
*G06F 12/02* (2006.01)
*G09G 5/39* (2006.01)

(52) U.S. Cl.
USPC ........... 345/574; 345/564; 345/531; 345/533; 345/566

(58) Field of Classification Search
USPC ........................... 345/574, 564, 531, 533, 566
See application file for complete search history.

(56) References Cited

U.S. PATENT DOCUMENTS

| | | | | |
|---|---|---|---|---|
| 4,395,699 A | * | 7/1983 | Sternberg | 382/257 |
| 4,414,685 A | * | 11/1983 | Sternberg | 382/257 |
| 4,766,431 A | * | 8/1988 | Kobayashi et al. | 345/570 |
| 4,939,642 A | * | 7/1990 | Blank | 712/22 |
| 5,450,544 A | * | 9/1995 | Dixon et al. | 345/555 |
| 5,973,707 A | * | 10/1999 | Mita | 345/574 |
| 6,359,660 B1 | * | 3/2002 | Matsuo et al. | 348/716 |
| 6,542,429 B2 | | 4/2003 | Koyanagi et al. | 365/230.03 |
| 6,670,960 B1 | * | 12/2003 | Evoy | 345/604 |
| 6,847,370 B2 | * | 1/2005 | Baldwin et al. | 345/564 |
| 7,411,630 B2 | * | 8/2008 | Kim et al. | 348/716 |
| 7,529,412 B2 | * | 5/2009 | Park | 382/232 |
| 2004/0100661 A1 | | 5/2004 | Tsumura et al. | 358/443 |
| 2008/0112012 A1 | * | 5/2008 | Yokoyama et al. | 358/3.03 |

FOREIGN PATENT DOCUMENTS

| | | |
|---|---|---|
| JP | 08-077343 A | 3/1996 |
| JP | 2001-285644 | 10/2001 |
| JP | 2004-40381 | 2/2004 |

OTHER PUBLICATIONS

Office Action which issued on Dec. 22, 2011, in counterpart Japanese patent application No. 2007-216405.

* cited by examiner

*Primary Examiner* — Ke Xiao
*Assistant Examiner* — Robert Craddock
(74) *Attorney, Agent, or Firm* — Fitzpatrick, Cella, Harper & Scinto

(57) ABSTRACT

Disclosed is an image processing apparatus for inputting a plurality of rectangular images each composed of n×n pixels and outputting line-by-line image data in which one line is composed of n×n×m pixels. A line buffer stores n lines of image data, each line is composed n×n×m pixels. The apparatus generate a write address for writing a rectangular image to the line buffer memory and a read-out address for reading line-by-line image data out of the line buffer memory, and changes over a method of generating the write address between a first write-address generating method and a second write-address generating method whenever m rectangular images are written to the line buffer, and changes over the read-out address between a first read-out-address generating method and a second read-out-address generating method whenever n lines of image data are read out of the line buffer.

5 Claims, 22 Drawing Sheets

| 1 | 2 | 3 | 4 |
|---|---|---|---|
| 5 | 6 | 7 | 8 |
| 9 | 10 | 11 | 12 |
| 13 | 14 | 15 | 16 |

FIG. 2A

PRIOR ART

| 17 | 18 | 19 | 20 |
|---|---|---|---|
| 21 | 22 | 23 | 24 |
| 25 | 26 | 27 | 28 |
| 29 | 30 | 31 | 32 |

FIG. 2B

PRIOR ART

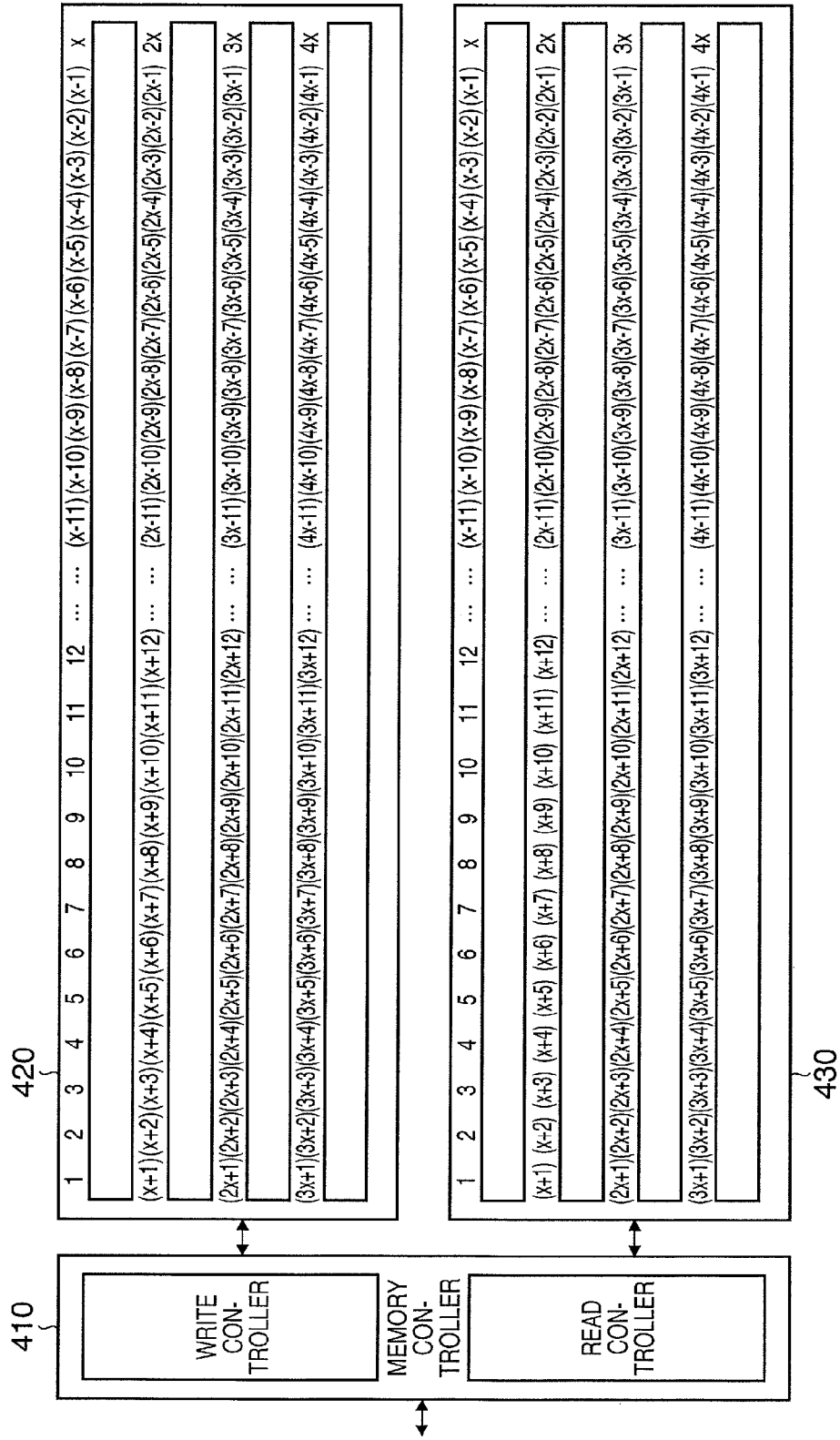

PRIOR ART

FIG. 5

PRIOR ART

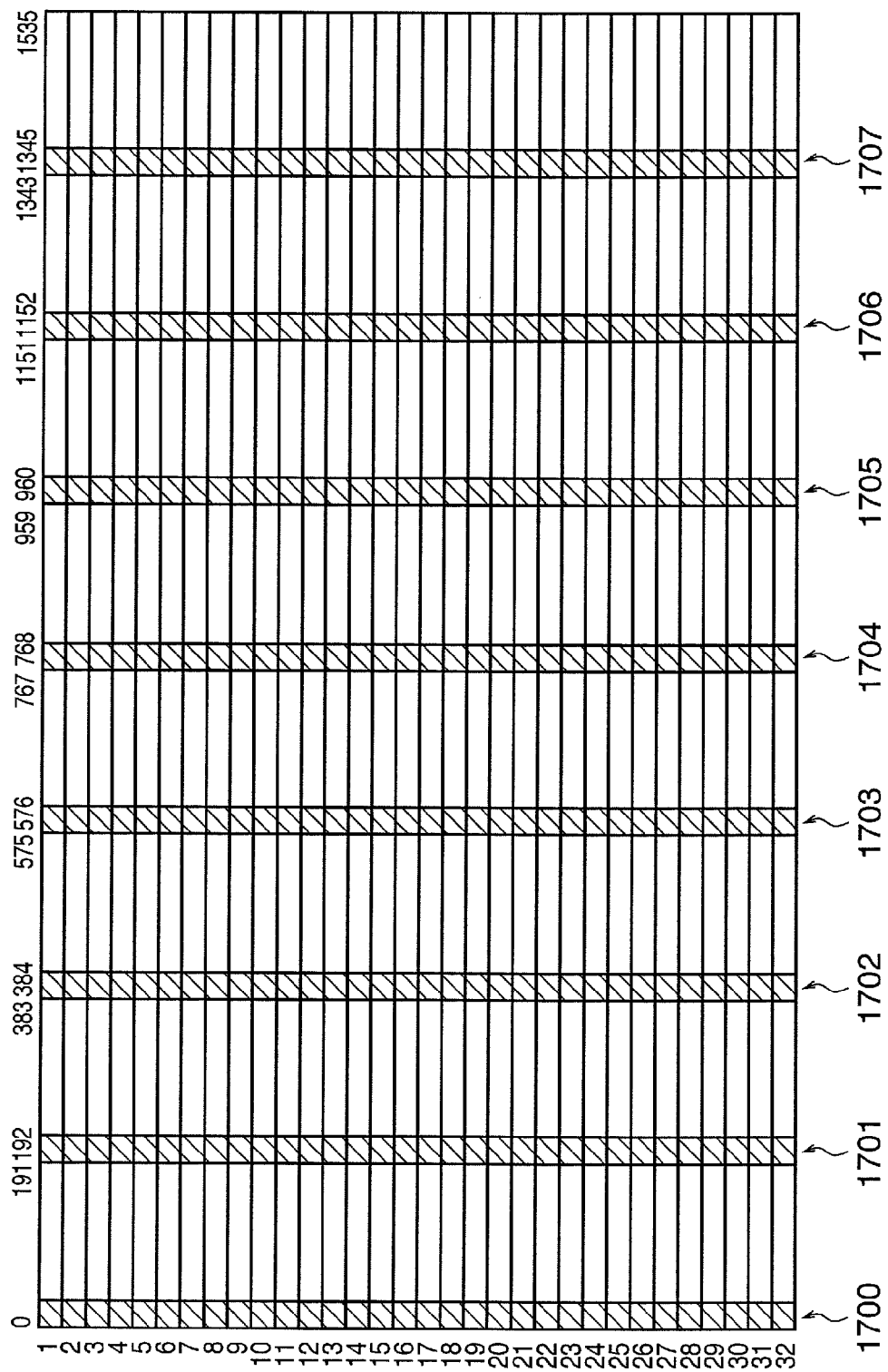

FIG. 18

| | | line_offset | rect_offset | return_offset | in_block_offset |
|---|---|---|---|---|---|
| WRITE CONTROL | odd line | NUMBER OF CURRENT LINE<br>1 line : 0<br>2 line : 1536... | (NUMBER OF CURRENT RECTANGULAR IMAGE / NUMBER OF RECTANGULAR IMAGES PER ONE ARRAY OF RECTANGULAR IMAGES) ×192 | (NUMBER OF CURRENT RECTANGULAR IMAGE % NUMBER OF RECTANGULAR IMAGES PER ONE ARRAY OF RECTANGULAR IMAGES) ×6 | 0〜5 |
| WRITE CONTROL | even line | NUMBER OF CURRENT LINE<br>1 line : 0<br>2 line : 6... | NUMBER OF CURRENT RECTANGULAR IMAGE ×192 | NOT USED | |
| READ CONTROL | odd line | NUMBER OF CURRENT LINE<br>1 line : 0<br>2 line : 1536... | (NUMBER OF CURRENT BLOCK / NUMBER OF RECTANGULAR IMAGES PER ONE ARRAY OF RECTANGULAR IMAGES) ×192 | (NUMBER OF CURRENT BLOCK % NUMBER OF RECTANGULAR IMAGES PER ONE ARRAY OF RECTANGULAR IMAGES) ×6 | |
| READ CONTROL | even line | NUMBER OF CURRENT LINE<br>1 line : 0<br>2 line : 6... | NUMBER OF CURRENT BLOCK ×192 | NOT USED | |

IMAGE PROCESSING APPARATUS AND METHOD

BACKGROUND OF THE INVENTION

1. Field of the Invention

The present invention relates to an image processing apparatus and method for inputting a plurality of rectangular images and converting the images to dot sequential raster image data.

2. Description of the Related Art

Consider a case where image data in page units composed of a plurality of rectangular images is output upon being converted to raster image data in line units using a buffer memory for image data. In this case, it is necessary that image data in page units input in units of rectangular images be converted to image data in line units. The most common method of performing this conversion involves making the conversion by a double-buffer scheme using a buffer memory whose capacity is double the amount of data equivalent to the following: (number of lines of image data contained in the rectangular image)×(number of pixels of one line).

Another method involves making the conversion from a rectangular image to raster image data by a single-buffer scheme using a buffer memory having a capacity equivalent to the following: (number of lines of image data contained in the rectangular image)×(number of pixels of one line). With this method, processing is executed in such a manner that after one line of image data has been read out of the buffer memory, the next rectangular image is written to the address from which data was read out (see the specifications of Japanese Patent Application Laid-Open Nos. 2004-40381 and 2001-285644).

Processing for converting rectangular images to image data in line units by the double-buffer scheme will now be described as a first example of the prior art.

Assume that a rectangular image comprises four lines of image data contained in the rectangular image and four pixels on each line. In such case the rectangular image will be composed of image data consisting of 4×4 pixels, for a total of 16 pixels.

FIGS. 2A and 2B are diagrams illustrating rectangular images, in which FIG. 2A illustrates a rectangular image that is input to a buffer memory initially and FIG. 2B the rectangular image that is input to the buffer memory next.

The order in which the pixel data is input to the buffer memory is as indicated by the numerical order in the diagrams. That is, when one line of pixel data in one rectangular image has been input, the next line of pixel data is input. Specifically, in the example of FIG. 2A, when pixel data of pixels 1 to 4 of the first line has been input, pixel data of pixels 5 to 8 of the second line is input next. When 16 pixels have been input to the buffer memory in this manner, the input of the rectangular image shown FIG. 2A is completed. When the rectangular image illustrated in FIG. 2B is input, pixel data of pixels 17 to 32 is input in a similar order. It should be noted that although only two rectangular images are shown in FIGS. 2A and 2B, pixel data of pixels 33 to 48 of a third rectangular image would similarly be placed in the order of the pixels of the rectangular images shown in FIGS. 2A and 2b. The same would hold true with regard to rectangular images from the fourth onward.

FIG. 3 is a block diagram illustrating the configuration of a memory circuit according to the double-buffer scheme.

Reference numerals 420 and 430 denote line buffer memories each having a capacity equal to the following: (number of lines of image data contained in the rectangular image)×[number of pixels (x) of one line]. These pertain to FIGS. 2A and 2B. A memory controller 410 controls writing of rectangular images to the line buffer memories 420, 430 and reading of image data from these line buffer memories. If x=32 holds, eight rectangular images corresponding to 32 pixels contained in one line of image data in page units are expressed as an array of rectangular images. The total number of pixels that can be stored in a line buffer memory in this case is 32×8=256. In this case, if image data of 256 pixels (equivalent to eight rectangular images) is written to the line buffer memory 420, a write controller changes over to the line buffer memory 430 and the rectangular image that is input next is stored in the line buffer memory 430. On the other hand, a read controller operates so as to read image data line by line out of the line buffer memory 420 in which writing by the write controller has been completed.

FIG. 4 is a diagram useful in describing the order in which image data is written to the line buffer memories by the write controller, and FIG. 5 is a diagram useful in describing the order in which image data is read out of the line buffer memories by the read controller. Thus, when image data is written, the image data is written to the line buffer memories in units of rectangular images; when image data is read out, the image data is read out line by line. However, in the case of such a double-buffer scheme, two 4-line buffer memories in each of which one line is composed of 32 pixels are required. The greater the size of a rectangular image, the larger the required capacity of the line buffer memory. This leads to a rise in cost.

Next, processing for converting rectangular images to image data in line units using a single buffer (e.g., only line buffer memory 420) will be described as a second example of the prior art.

The order in which the image data of the initial array of rectangular images is written is the same as in FIG. 4. The order of read-out of the image data of this initial array of rectangular images is as illustrated in FIG. 5. However, here a single buffer is used. When image data has been read out of this line buffer memory line by line, therefore, the address at which the rectangular image input next is stored is different.

FIG. 6 is a diagram illustrating the state that results when, after one line of image data has been read out of the line buffer memory, two rectangular images that were input next are stored at the addresses from which the image data was read out.

Here pixels 1 to 16 and pixels 17 to 32 of two rectangular images (shown in FIGS. 2A and 2B) have been stored on line 600. Similarly, after the completion of read-out of the initial array of rectangular images following completion of read out of the image data of each main scan, image data of pixels 33 to 64, pixels 65 to 96, pixels 97 to 128 is stored on lines 601, 602, 603, respectively.

Figure 7:
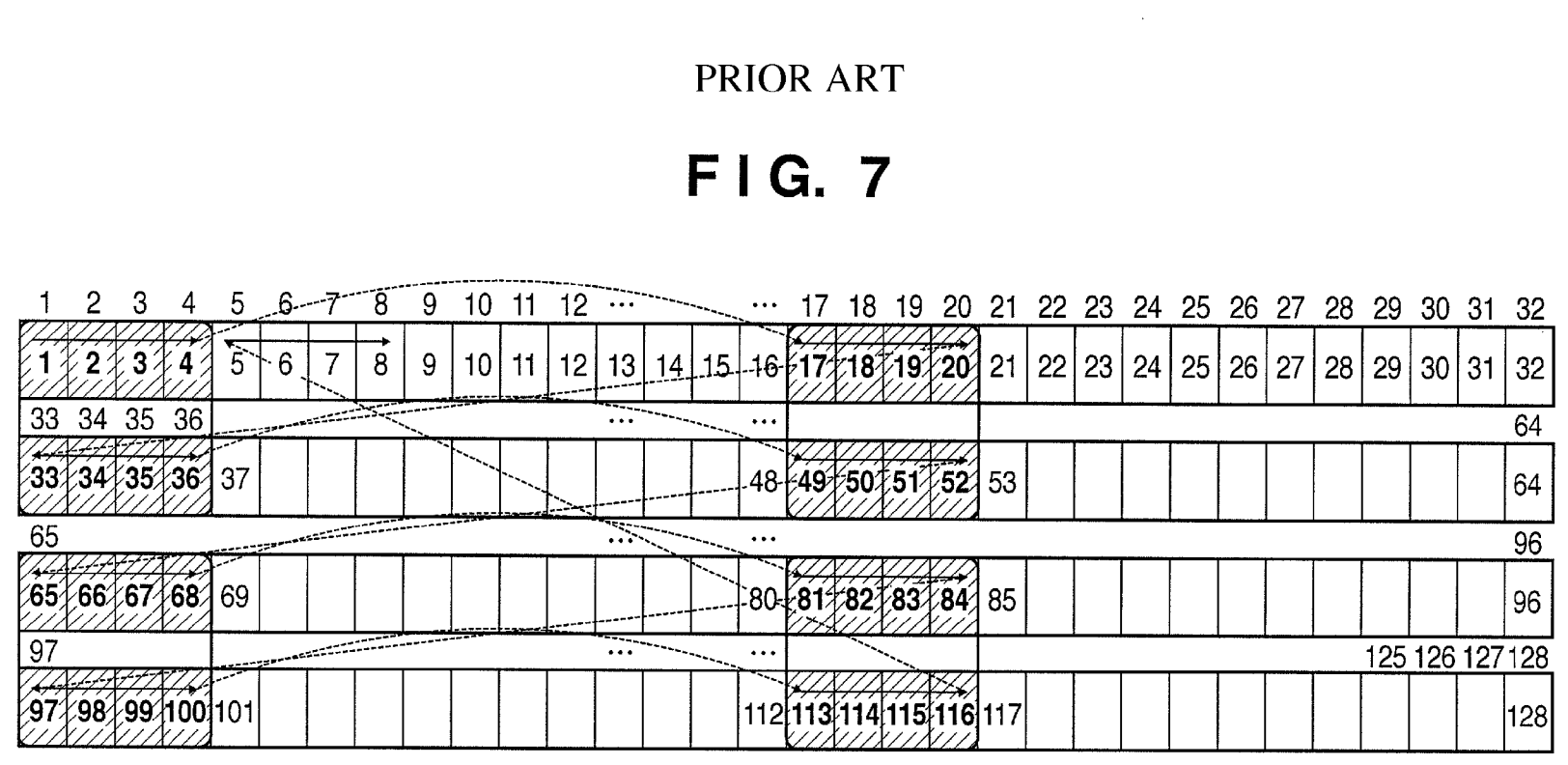

FIG. 7 is a diagram useful in describing read-out of image data of a second array of rectangular images. At read-out of the first line of image data, pixels 1 to 4 of the first rectangular image, pixels 17 to 20 of the second rectangular image, pixels 33 to 36 of the third rectangular image are read out, this continuing in similar fashion up to pixels 113 to 116 of the eighth rectangular image. The order in which pixels are read out is as indicated by the dashed lines. Addressing and read-out are performed in similar fashion in relation to the second line of image data, i.e., pixels 5 to 8 and pixels 21 to 24.

Figure 8:
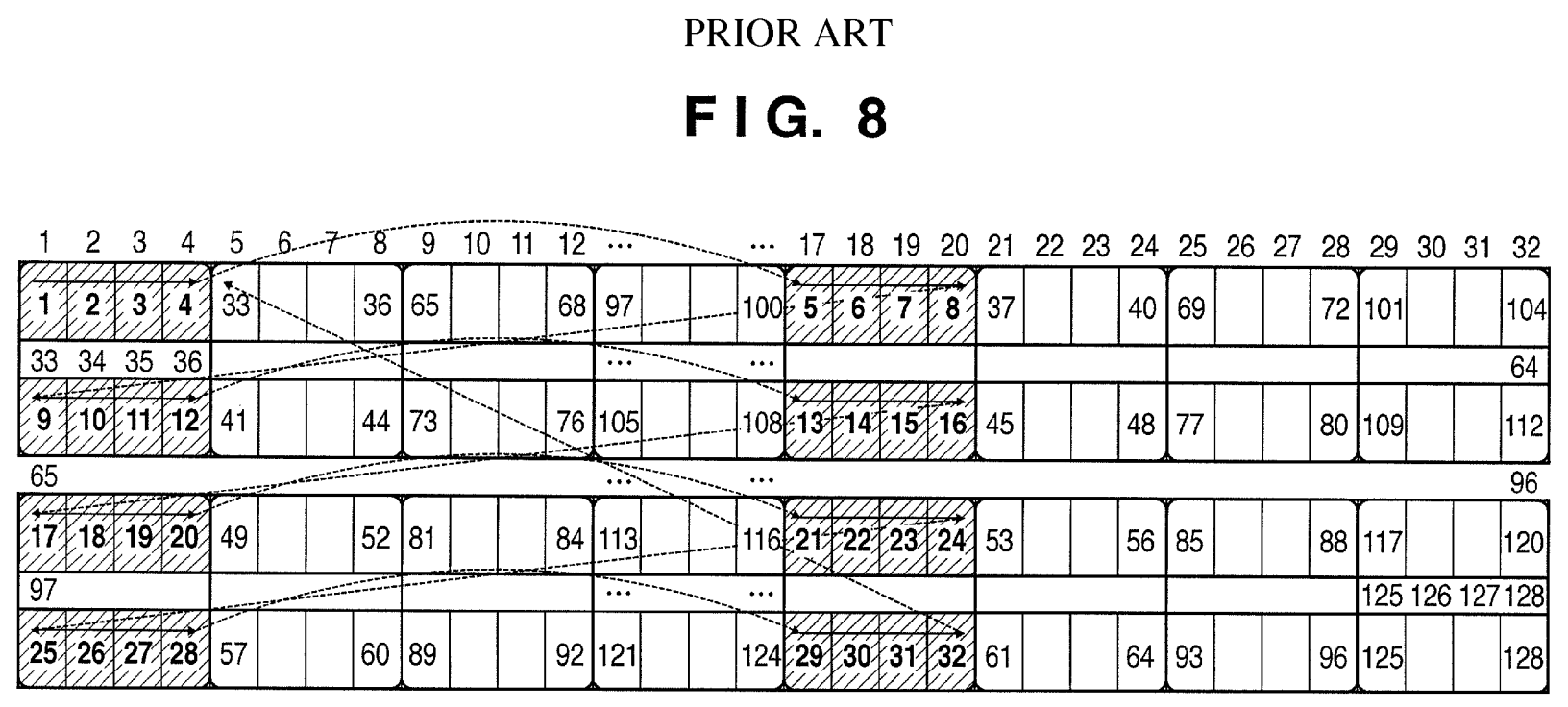

FIG. 8 is a diagram illustrating the manner in which pixels of rectangular images input next at positions of pixels read out in the order shown in FIG. 7 are written. FIG. 8 illustrates the state that results when, at read-out of image data of the second array of rectangular images, the initial and second rectangular images (FIGS. 2A and 2B) of the third array of rectangular images are input and stored.

Figure 9:
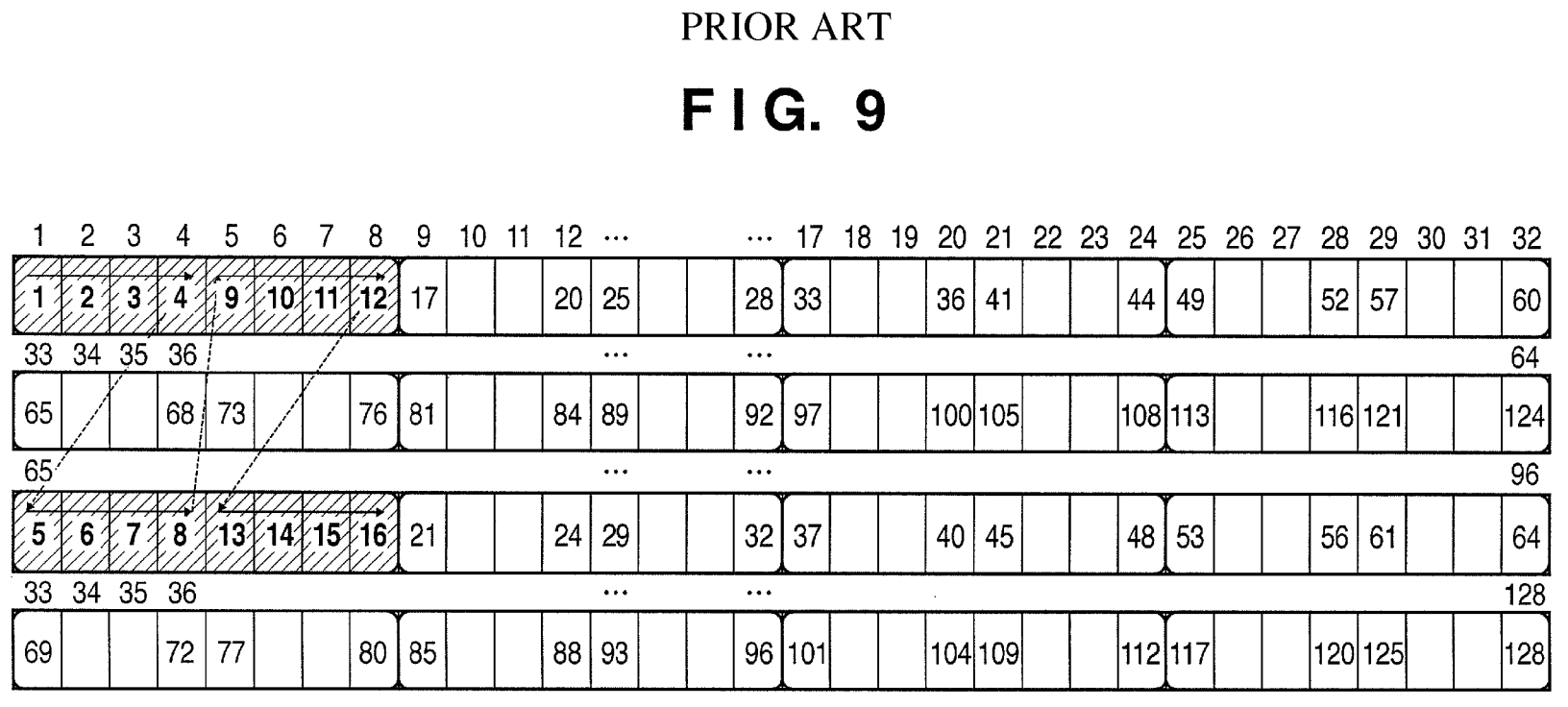

FIG. 9 is a diagram illustrating the state that results when, after the third array of rectangular images has thus been stored in the line buffer memory, read-out of the image data of one main scan begins and the initial rectangular image (FIG. 2A) of the fourth array of rectangular images input next attendant upon read-out of the data is stored at the position of the image data that was read out.

Although the details will not be described, at read-out of image data of the fifth array of rectangular images, i.e., at writing of the image data of the sixth array of rectangular images, an addressing method similar to that used when writing the image data of the first array of rectangular images is adopted.

Thus, this method is such that even among small images of 4 pixels×4 lines and 32 pixels in the main scan direction, six addressing operations are required. Accordingly, in a case where the size of rectangular images to undergo conversion processing is large and image size actually used is taken into account, addressing control in data write and read becomes more complicated.

Thus, with the prior art described above, processing for converting from rectangular images to raster image data is complicated. That is, with the former of the two methods, a memory capacity that is twice the number of sub-scan-lines is required. In order to achieve high-speed operation, therefore, a memory of very large memory capacity is incorporated in the integrated circuit.

As described above, the latter of the two methods requires processing in which a rectangular image is written to addresses from which image data has been read, and the written image data is read out in the main-scan direction. The processing becomes more complicated whenever the number of rectangular images increases. In particular, if it is attempted to implement such addressing methods by hardware alone, verification of operation takes time. Further, there is a greater risk that bugs will occur since it is possible that all addressing methods will be realized by hardware without undergoing verification.

SUMMARY OF THE INVENTION

An aspect of the present invention is to eliminate the above-mentioned conventional problems.

Moreover, another aspect of the present invention is to provide an image processing apparatus and method that simplify addressing at the time of memory access while avoiding an increase in required memory capacity in processing for converting rectangular images to raster image data.

According to an aspect of the present invention, there is provided an image processing apparatus for inputting a plurality of rectangular images each composed of n×n pixels and outputting line-by-line image data in which one line is composed of n×n×m pixels, comprising:
  a storage unit capable of storing n lines of pixel data in which one line is composed of n×n×m pixels;
  an address generating unit configured to generate a write address for writing the rectangular image to the storage unit and a read-out address for reading line-by-line image data out of the storage unit;
  a switching unit configured to switch over a method of generating the write address between a first write-address generating method and a second write-address generating method whenever n×m rectangular images are written to the storage unit, and switch over the read-out address between a first read-out-address generating method and a second read-out-address generating method whenever n lines of image data are read out of the storage unit; and
  a control unit configured to control the storage unit so as to read line-by-line image data out of the storage unit based upon the first read-out-address generating method after a rectangular image has been written to the storage unit based upon the first write-address generating method, and read line-by-line image data out of the storage unit based upon the second read-out-address generating method after a rectangular image has been written to the storage unit based upon the second write-address generating method.

According to an aspect of the present invention, there is provided an image processing method in an image processing apparatus having a storage unit capable of storing n lines of pixel data in which one line is composed of n×n×m pixels, a plurality of rectangular images each composed of n×n pixels being input to the apparatus and the apparatus outputting line-by-line image data in which one line is composed of n×n×m pixels, the method comprising:
  a generating step of generating a write address for writing the rectangular image to the storage unit and a read-out address for reading line-by-line image data out of the storage unit;
  a switching step of switching over a method of generating the write address between a first write-address generating method and a second write-address generating method whenever n×m rectangular images are written to the storage unit, and switching over the read-out address between a first read-out-address generating method and a second read-out-address generating method whenever n lines of image data are read out of the storage unit; and
  a control step of controlling the storage unit so as to read line-by-line image data out of the storage unit based upon the first read-out-address generating method after a rectangular image has been written to the storage unit based upon the first write-address generating method, and read line-by-line image data out of the storage unit based upon the second read-out-address generating method after a rectangular image has been written to the storage unit based upon the second write-address generating method.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are diagrams illustrating an example of the composition of rectangular images, in which FIG. 2A illustrates an initial rectangular image and FIG. 2B a rectangular image that is input next;

FIG. 3 is a block diagram illustrating the configuration of a double-buffer-type memory circuit;

Figure 5:
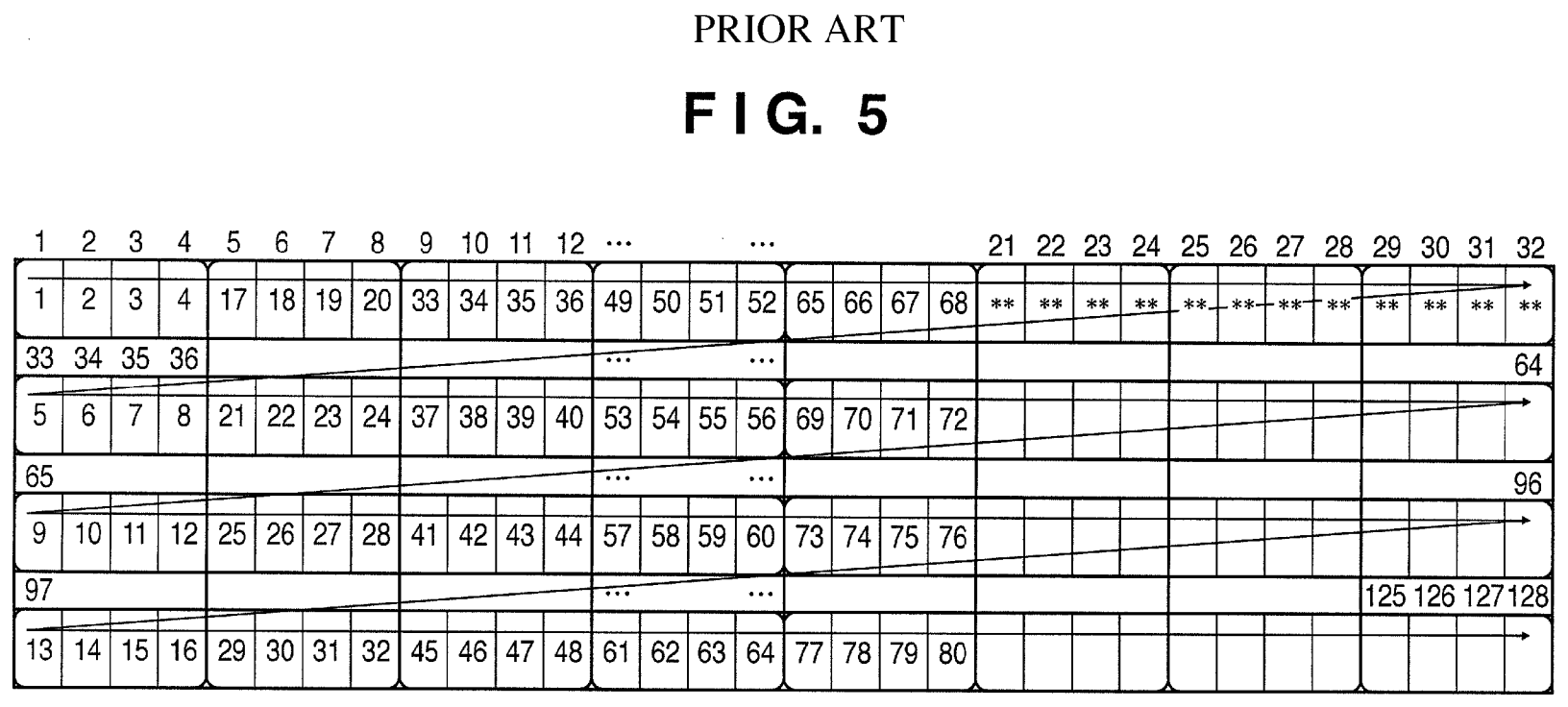

FIG. 5 is a diagram useful in describing the order in which image data is read out of line buffer memories by a read controller;

FIG. 7 is a diagram useful in describing read-out of image data of a second array of rectangular images;

FIG. 8 is a diagram illustrating the manner in which pixels of a rectangular image input next are written to positions from which pixels were read out in the order shown in FIG. 7 are written;

FIG. 9 is a diagram illustrating a state that results when, after a third array of rectangular images has been stored in a line buffer memory, read-out of image data of one main scan begins and an initial rectangular image of a fourth array of rectangular images input next attendant upon read-out of the data is stored at the positions of the image data that was read out;

FIG. 10 is a diagram useful in describing order of addresses when image data of an initial array of rectangular images is written to a line buffer memory in this embodiment;

FIG. 11 is a diagram useful in describing order of read-out of a first line of image data of an array of rectangular images stored in the manner illustrated in FIG. 10 according to this embodiment;

FIG. 12 is a diagram illustrating a state that results when, after a first line of image data of the initial array of rectangular images of FIG. 11 is read out, first and second rectangular images, which are from image data of a second array of rectangular images input next, are written to the line buffer memory according to this embodiment;

FIG. 13 is a diagram illustrating a state that results when image data of a second array of rectangular images is written to the line buffer memory according to this embodiment;

FIG. 14 is a diagram useful in describing processing for reading image data of the second array of rectangular images shown in FIG. 13 out of the line buffer memory;

FIG. 17 is a diagram illustrating the relationship between addresses and data of a line buffer memory according to this embodiment;

FIG. 18 is a diagram useful in describing types of offsets and meanings of offsets depending on mode in this embodiment;

DESCRIPTION OF THE EMBODIMENTS

Figure 1:
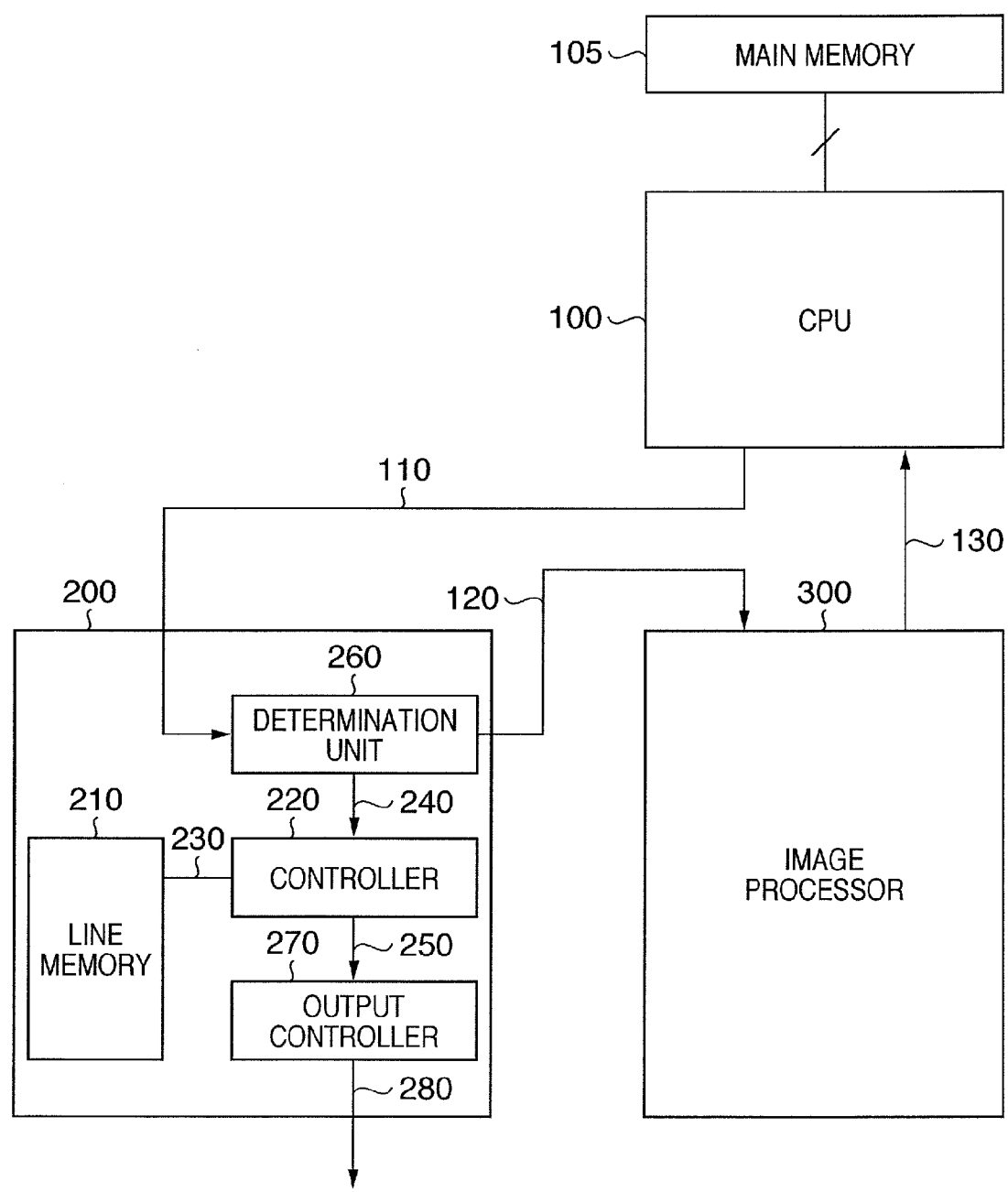
FIG. 1 is a block diagram illustrating the configuration of an image processing apparatus for converting a rectangular image to dot sequential raster image data according to an exemplary embodiment of the present invention.
Figure 4:
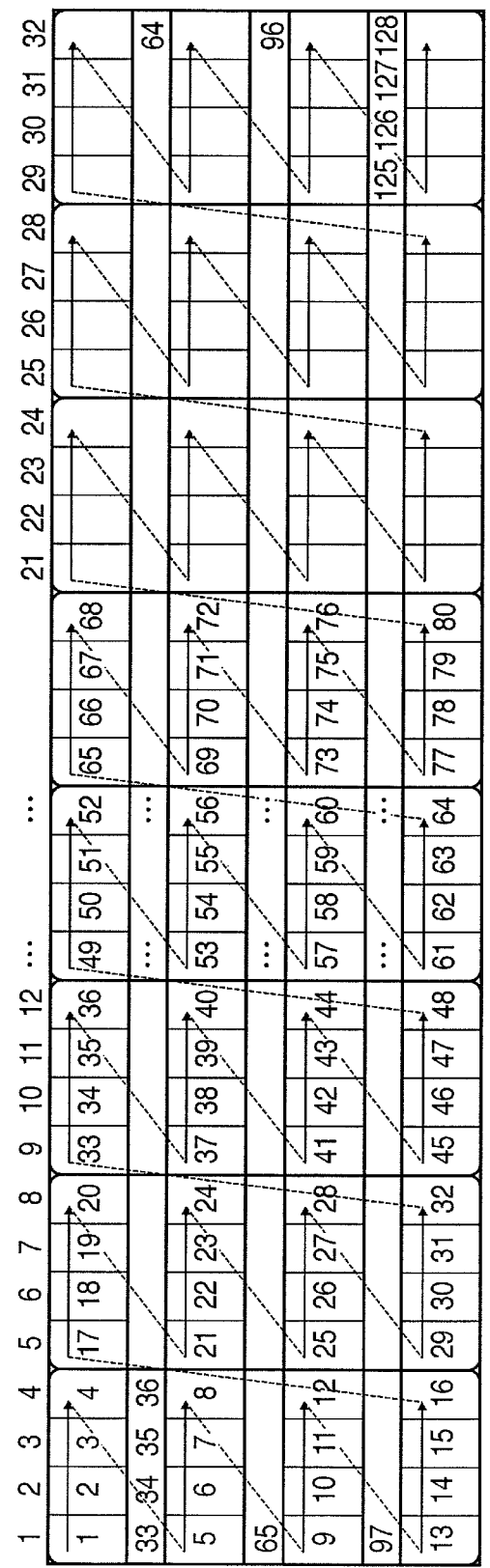
FIG. 4 is a diagram useful in describing the order in which image data is written to line buffer memories by a write controller.
Figure 6:
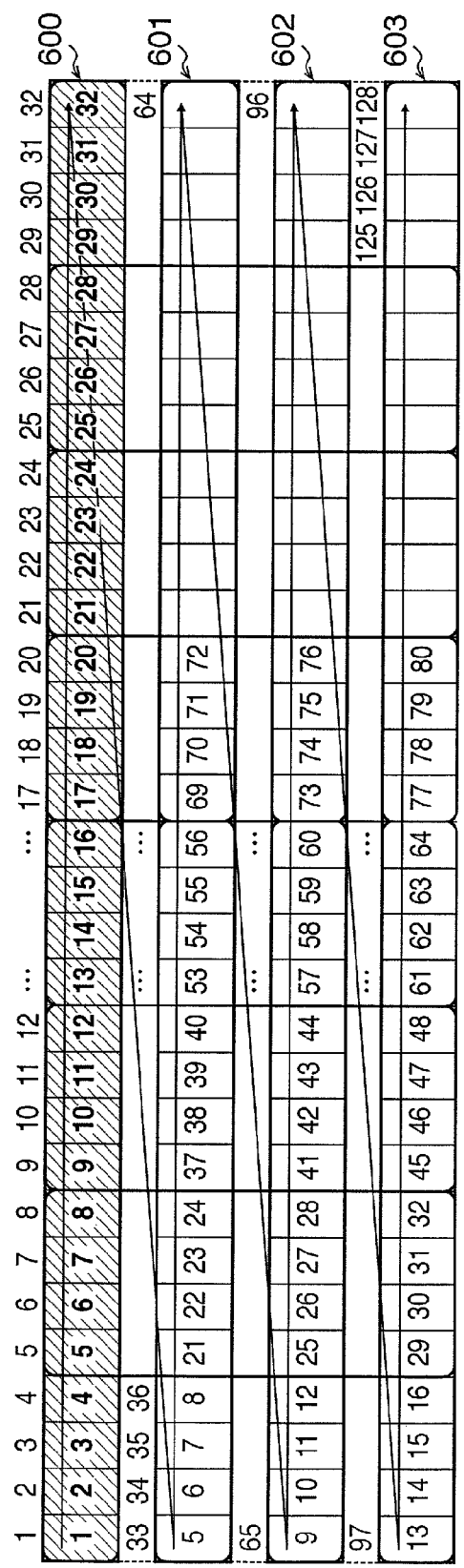
FIG. 6 is a diagram illustrating a state that results when, after the completion of read-out of one main-scan line of data, two rectangular images that were input next are stored in the memory area from which the data was read out.

Embodiments of the present invention will now be described in detail with reference to the accompanying drawings. It should be noted that the embodiments below are not intended to limit the present invention set forth in the claims and that not all of the combinations and features described in the embodiments are necessarily essential as means for attaining the objects of the invention.

First, the concept of addressing according to this embodiment will be described with reference to FIGS. 10 to 14.

Figure 10:
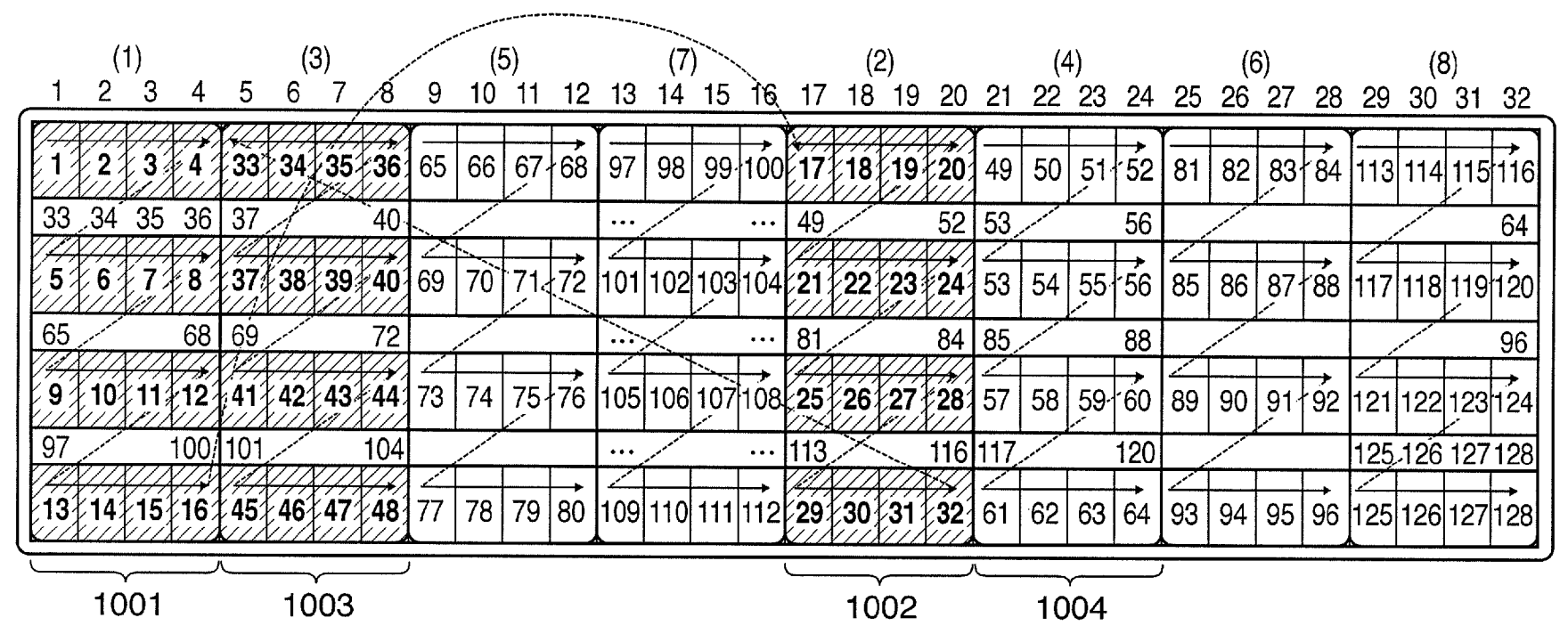

FIG. 10 is a diagram useful in describing the order of addresses when image data of an initial array of rectangular images (eight rectangular images) is written to a line buffer. As in the description of the prior art rendered above, here also a case where one line has 32 pixels and one rectangular image is composed of 4×4 pixels will be described. The parenthetic numerals (1) to (8) in the drawings represent the order in which the rectangular images are written.

Here the first rectangular image (FIG. 2A) is written to addresses 1 to 4, 33 to 36, 65 to 68 and 97 to 100, as indicated at 1001. Next, the second rectangular image (FIG. 2B) is written to addresses 17 to 20, 49 to 52, 81 to 84 and 113 to 116, as indicated at 1002. Similarly, a third rectangular image is written to addresses 5 to 8, 37 to 40, 69 to 72 and 101 to 104, as indicated at 1003. A fourth rectangular image is written to addresses 21 to 24, 53 to 56, 85 to 88 and 117 to 120, as indicated at 1004.

This means that the data within one rectangular image is written with a 32-address offset every line, and that the next rectangular image is written with a 16-address offset. If the rectangular images that follow the second, fourth and sixth rectangular images are advanced by 16 addresses, the capacity of the line buffer shown in FIG. 10 will be exceeded. Therefore, these images are wrapped around and advanced a total of 16 addresses.

Figure 11:
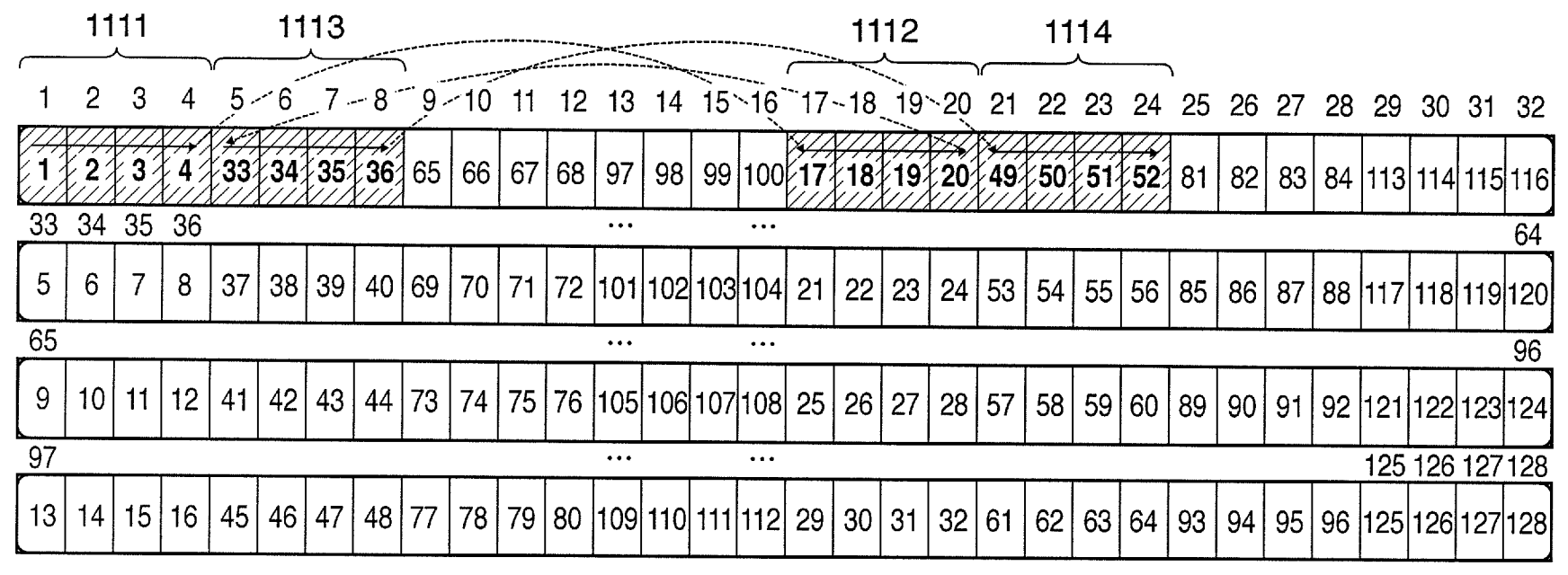

FIG. 11 is a diagram useful in describing order of read-out of a first line of image data of an array of rectangular images stored in the manner illustrated in FIG. 10, so as to obtain a raster image of a first line of the array of rectangular images.

Here, in the order of the first line of image data of the original rectangular images, image data is read out in the following order: data 1111 at addresses 1 to 7, then data 1112 at addresses 17 to 20, then data 1113 at addresses 5 to 8, and then data 1114 at addresses 21 to 24.

In the second example of the prior art described above, the rectangular image input next is written to addresses from which image data has been read out. In this embodiment, however, the writing of the data of the next rectangular image is not started until the read-out of the first line of image data of the array of rectangular images is completed.

Figure 12:
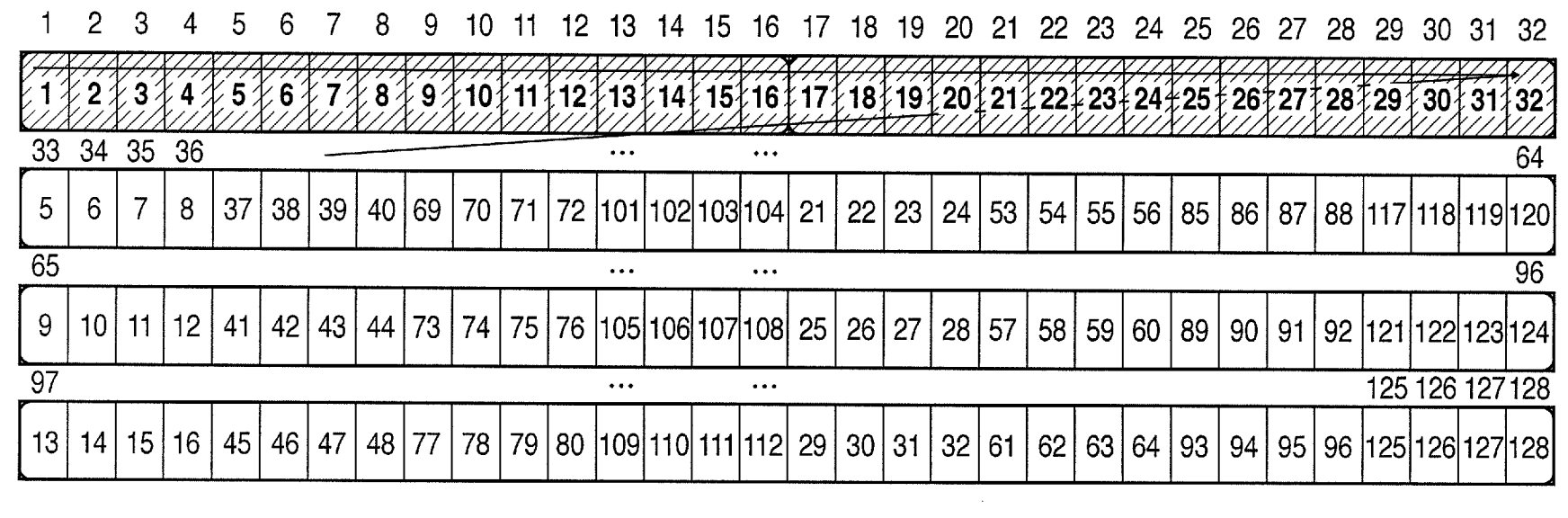

FIG. 12 is a diagram illustrating a state that results when, after the first line of image data of the initial array of rectangular images of FIG. 11 has been read out, first and second rectangular images, which are from image data of a second array of rectangular images input next, are written to the line buffer memory. Here the pixel data of the first and second rectangular images has been stored in the order of the addresses.

Thus, the rectangular image data of the second array of rectangular images need only be written in order starting from address 1 in the order of the addresses, and the pixel data of each rectangular image need only be written in the order of the pixels indicated in FIGS. 2A and 2B. However, even though the first line of image data of the initial array of rectangular images is read out, only the image data of two rectangular images (32 pixels in the example of FIG. 12) can be written. Therefore, if input of data is fast relative to read-out speed, it is necessary to exercise control in such a manner that the image data of the succeeding two rectangular images is written upon waiting for the end of read-out of the second line of image data.

Figure 13:
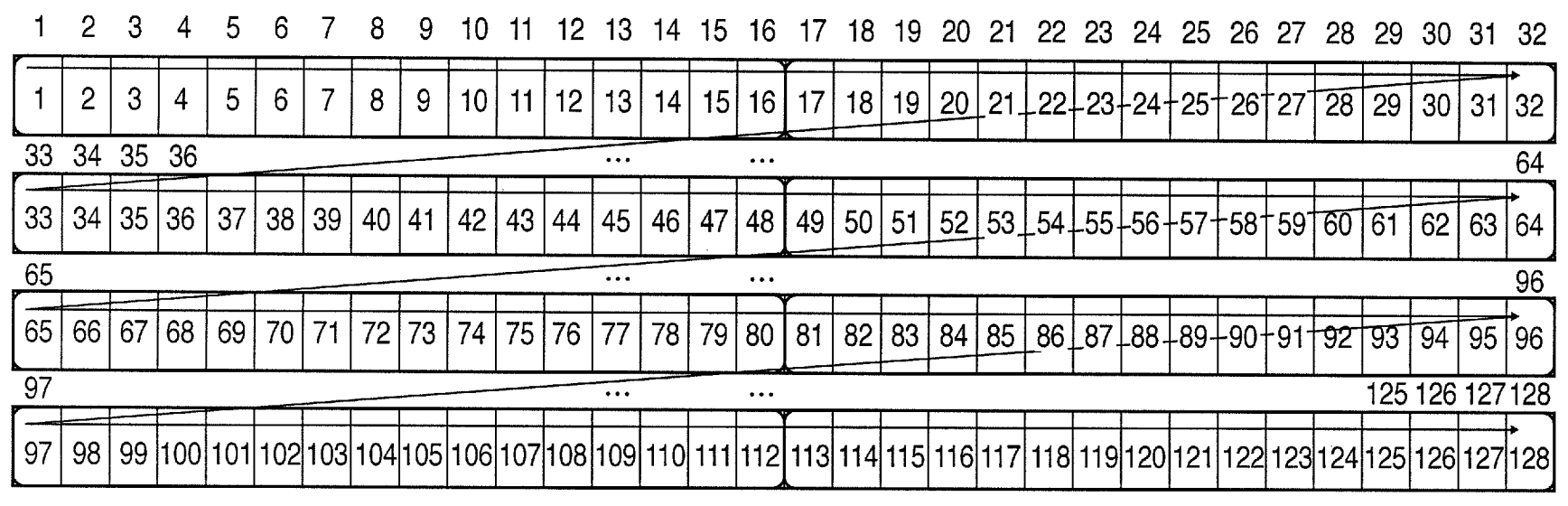

FIG. 13 is a diagram illustrating a state that results when image data of a second array of rectangular images is thus written to the line buffer memory. Here pixel data of the first and second rectangular images have been stored in the order of the addresses on the initial line of the line buffer memory, and pixel data of the third and fourth rectangular images have been stored in the order of the addresses on the next line. Similarly, pixel data of the fifth and sixth rectangular images have been stored in the order of the addresses on the third line, and pixel data of the seventh and eighth rectangular images have been stored in the order of the addresses on the fourth line.

Figure 14:
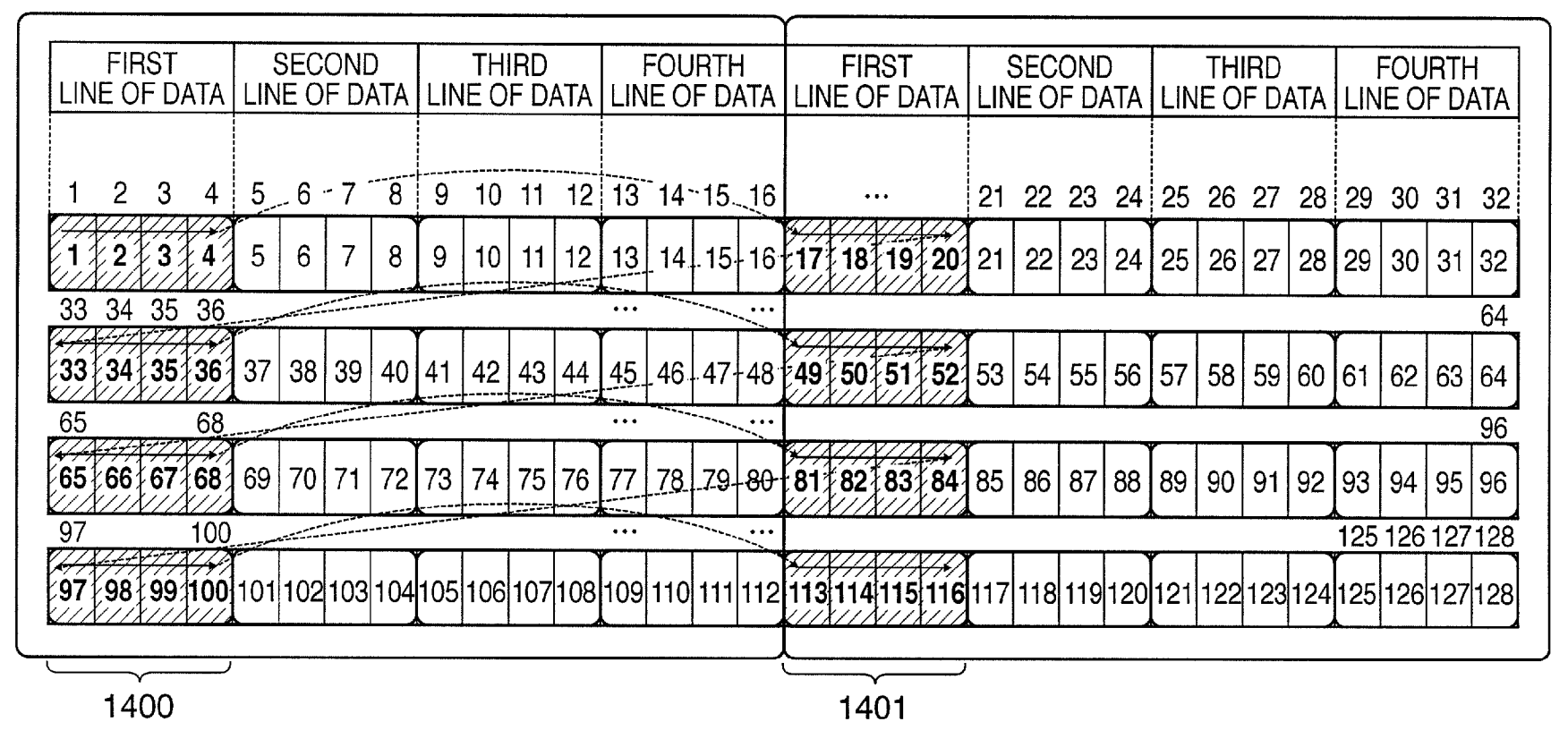

FIG. 14 is a diagram useful in describing processing for reading image data of the second array of rectangular images shown in FIG. 13 out of the line buffer memory.

When the first line of data in the main-scan direction is read out, the data is read out in the following order of the addresses: addresses 1 to 4, addresses 17 to 20, addresses 33 to 36, addresses 49 to 52, addresses 65 to 68, addresses 81 to 84, addresses 97 to 100, and addresses 113 to 116.

In this case, it is assumed that image data of the third array of rectangular images cannot be written until read-out of the first line of data of the second array of rectangular images ends, in a manner similar to accessing of the image data of the initial array of rectangular images. When read-out of the first line of image data of the second array of rectangular images is completed, the initial two rectangular images of the third array of rectangular images are written. It is assumed that the order in which writing is performed at this time employs an addressing method identical with that used when writing the image data of the initial array of rectangular images shown in FIG. 10.

Employing this addressing method is advantageous in that when one page of image data that has been divided into rectangular images is input and converted to a raster image, the addresses to which the image data of each array of rectangular images is written and the addresses from which this image data is read out need only be changed in dependence upon whether the image data to be input is that of an odd-numbered array of rectangular images or that of an even-numbered array of rectangular images.

An example of application to a conceivable system will now be described based upon this addressing concept.

FIG. 1 is a block diagram illustrating the configuration of an image processing apparatus for converting a rectangular image to dot sequential raster image data according to this embodiment.

A large-capacity main memory 105 is connected to a CPU 100. Image processors 200 and 300 are connected to the CPU 100 via inter-chip buses 110, 130, respectively. It is assumed that image data in page units that is input from an image input unit (not shown) has been stored in the main memory 105. In a case where image processing is applied to image data in page units stored in the main memory 105, it will be necessary to provide the image processor 300 with a buffer memory for storing one page of image data if it is attempted to execute image processing with the image data in page units as is. However, providing the image processor 300 with a large-capacity buffer memory capable of storing one page of image data will raise cost. Accordingly, in this embodiment, images (rectangular images) obtained by dividing page-by-page image data that has been stored in the main memory 105 into a plurality of rectangular areas are adopted as the units and are subjected to image processing by the image processor 300. In this case, image processing can be executed if the image processor 300 is provided with a buffer memory capable of storing a rectangular image. In this embodiment, however, image data is output with image data that is output from the image processor 200 serving as line-by-line image data equivalent to one line of image data in page units. In order to output image data as image data in line units, it is necessary to convert the rectangular image to image data in line units. The mechanism for achieving this conversion is incorporated in the image processor 200.

Whether image data that has been input to the image processor 200 from the main memory 105 via the inter-chip bus 110 is image data to be processed by the image processor 200 is determined by a determination unit 260 in FIG. 1. If it is determined that this image data is image data to be processed by the image processor 200, the image data is sent to an internal data bus 240. On the other hand, if it is determined that this image data is not image data to be processed by the image processor 200, then the image data is sent to the image processor 300 via the inter-chip bus 120.

A controller 220 executes processing for converting a rectangular image to raster image data and is connected to a line memory 210 (corresponding to the above described line buffer memory) via an internal memory bus 230. The controller 220 converts a rectangular image to dot-sequential raster image data and supplies the raster image data to a data output controller 270 via an internal data bus 250. The raster image data is then output from the image processor 200 to a bus 280 under the control of the data output controller 270.

Figure 15:
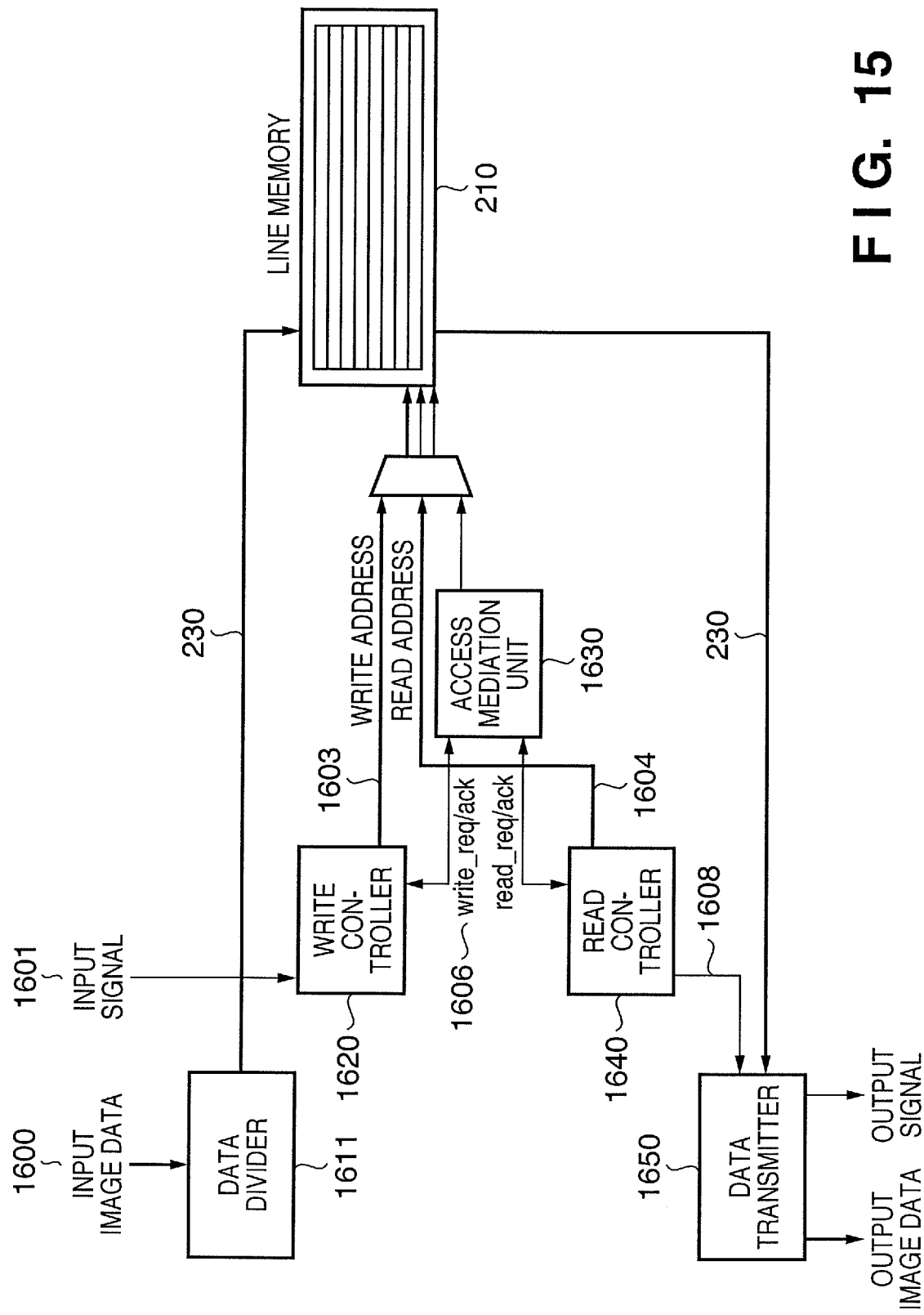
FIG. 15 is a block diagram illustrating the configuration of a controller according to this embodiment.

FIG. 15 is a block diagram illustrating the configuration of the controller 220 according to this embodiment.

Image data 1600 of a rectangular image input under control of an input signal 1601 is divided into line units by a data divider 1611. When a fixed amount of data accumulates in the data divider 1611, a write controller 1620 outputs a write request 1606 and a write address 1603 to an access arbitration unit 1630. If the write request is permitted by the access arbitration unit 1630, the write controller 1620 writes image data that has been stored in a buffer of the data divider 1611 to the line memory 210 via the internal memory bus 230.

Meanwhile, the state of data write and data read to and from the line memory 210 is monitored by the access arbitration unit 1630. The access arbitration unit 1630 performs status management such as timing of end of read-out of one line, described above, and a mode for giving priority to write or read.

If read-out of data from the line memory 210 is permitted by the access arbitration unit 1630, a read controller 1640 reads image data out of the line memory 210 via the internal memory bus 230. Upon receiving notification by a control signal 1608, a data transmitter 1650 loads the data from the internal memory bus 230 and stores it in a buffer (not shown) of the data transmitter 1650.

In the example of the system described, one pixel is composed of data of each of the color components C (cyan), M (magenta), Y (yellow) and K (black). In order to express each color using 12 bits (4096 tones), one pixel consists of 48 bits (12 bits×4 colors). It is assumed that the size of one rectangular image is 32 pixels×32 lines. The number of pixels in the line direction is a maximum of 8192 pixels (equivalent to 256 rectangular images).

Figure 16:
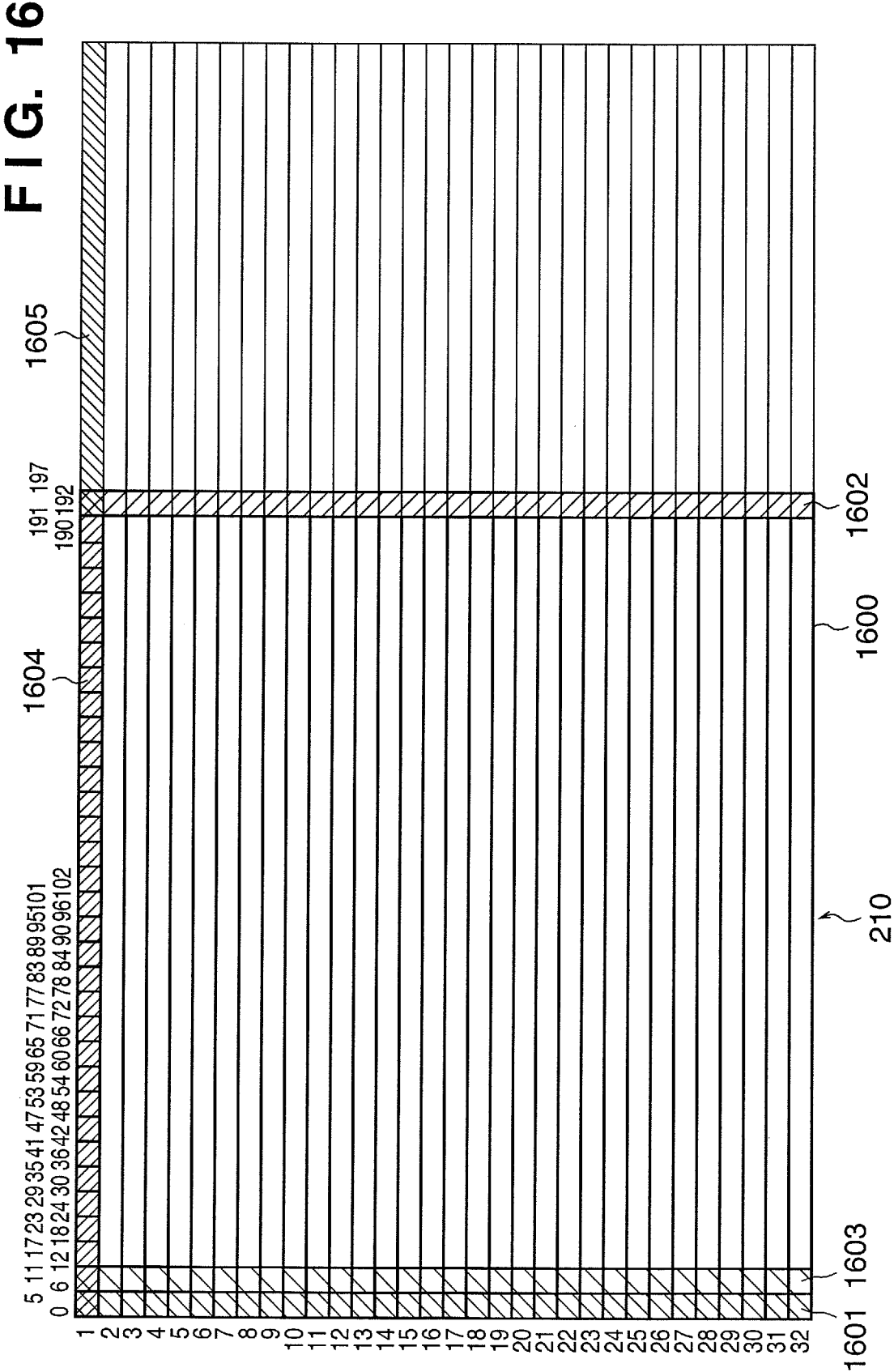
FIG. 16 is a diagram illustrating a data array of rectangular images in a line buffer memory according to this embodiment.

FIG. 16 is a diagram illustrating a data array of rectangular images in the line memory 210.

Numbers (1 to 32) in the vertical direction indicate the lines (line numbers) in the line memory. It is assumed that the lines have been set in correspondence with the numbers, i.e., 1 indicates the first line, 2 indicates the second line, and so on.

Since the number of pixels on one line of one rectangular image is 32, the amount of one line of data of the rectangular image is 48 bits×32 (pixels) 1536 bits. If a line memory having a bit width of 256 bits per address is used as the line memory 210, then six addresses are required with regard to one line of one rectangular image. Further, with the number (8192) of pixels in the line direction mentioned above, 1536 addresses are required. Accordingly, if we assume that the line memory 210 is marked off in units of one line (8192 pixels), then the leading address of the second line will be address "1536". The leading address of each line will increase in increments of "1536" thereafter.

FIG. 16 illustrates the address offset numbers (at the top of the diagram) of the leading portion of each line, as well as each line number (on the left side). The leading portion of each line is illustrated in enlarged form.

An actual addressing sequence will be described next.

Described first will be the addressing sequence (a first write method) when odd-numbered arrays of rectangular images are written to the line memory 210.

When image data of an odd-numbered array of rectangular images is input, the write controller 1620 writes the first rectangular image in conformity with the positions of address offset numbers 0 to 5 (the write operation is performed in the vertical direction 0 to 5 in FIG. 16 indicated at 1601). Further, the write controller 1620 writes the second rectangular image to addresses 192 to 197, which are indicated at 1602, while imparting an address offset of 32 lines in one rectangular image (32×6 addresses=192 addresses).

If this process is repeated, eight rectangular images will be written, as indicated at 1700 to 1707 in FIG. 17. When a ninth rectangular image is written next, the addresses wrap around. When the addresses have wrapped around, the block is shifted by one and the ninth rectangular image is written to the line memory 210 in the area corresponding to addresses 6 to 11 indicated at 1603 in FIG. 16.

By writing 256 rectangular images to the line memory 210 using the above-described method (the first write method), odd-numbered arrays of rectangular images are written to all areas of the line memory 210.

In a case where image data in line units is read out of the line memory 210 to which an array of rectangular images has been written by the first write method, the pixel data that was written to the first line is read out in the order of area 1604, area 1605, . . . , shown in FIG. 16. As a result, the read controller 1640 reads out line-by-line image data in which the number of pixels of one line is 32 pixels×256=8192 pixels. By repeating the read-out of line-by-line image data for the second line, third line, $32^{nd}$ line, the read controller 1640 reads the odd-numbered data array of rectangular images out of the line memory 210. The method of reading line-by-line image data out of the line memory 210 to which an array of rectangular images has been written by the first write method shall be referred to as a "first read-out method".

Described next will be the addressing sequence (a second write method) when even-numbered arrays of rectangular images are written to the line memory 210.

In the case of an even-numbered array of rectangular images, the write controller 1620 writes the first rectangular image to area 1604 shown in FIG. 16. Further, it is so arranged that each rectangular image is written to the line memory 210 as one block (equivalent to six addresses). The write controller 1620 writes the second rectangular image to the region 1605 indicated in FIG. 16. The write controller 1620 repeats an operation whereby rectangular images from the third onward are written to the area corresponding to the first line in the line memory 210. As result of the write controller 1620 writing eight rectangular images, the first line of the line memory 210 is placed in a state in which rectangular images have been written to all areas. Ninth to $16^{th}$ rectangular images are written to the area corresponding to the second line in line memory 210. Similarly, $17^{th}$ to $24^{th}$ rectangular images are written to the third line, and $25^{th}$ to $32^{nd}$ rectangular images are written to the fourth line. Eventually, $24^{th}$ to $256^{th}$ rectangular images are written to the $32^{nd}$ line, and a state in which the even-numbered arrays of rectangular images have been written to all areas of the line memory 210 is attained.

When an even-numbered array of rectangular images is read out of the line memory 210, on the other hand, the read controller 1640 reads out the data while skipping 192 addresses at a time, in the manner of addresses 0 to 5, addresses 192 to 197 and addresses 384 to 389. If wrap-around is performed up to the end of one line, an offset of six addresses is applied and data is read out in the manner of addresses 6 to 11, addresses 198 to 203 and addresses 390 to 395. When read-out of one line of image data thus ends, a data area equivalent to eight rectangular images is freed up. The method of reading line-by-line image data out of the line memory 210 to which an array of rectangular images has thus been written by the second write method shall be referred to as a "second read-out method".

It is possible for the method of generating offset addresses for implementing the first write method, second write method, first read-out method and second read-out method to be put in mathematical form in accordance with the method in which the line memory 210 is used.

This time four offsets, namely line_offset, rect_offset, return_offset and in_block_offset are used, and address generation is performed while changing over the content of the offset in accordance with whether an array is an odd-numbered array of rectangular images or even-numbered array of rectangular images.

An equation for address generation can be expressed as follows:

$$\text{address}=\text{line\_offset}+\text{rect\_offset}+\text{return\_offset}+\text{in\_block\_offset}$$

FIG. 18 is a diagram useful in describing types of offsets and meanings of offsets depending on mode.

In the present example, we have the following:
(1) Write Mode:

(odd-numbered array of rectangular images) odd line
address=(current_line-1)×1536+[(current_rect-1)% 8]×192+Int[(current_rect-1)/8]×6+current_beat  Equation (1)

(even-numbered array of rectangular images) odd line
address=(current_line-1)×6+(current_rect-1)×192+0+current_beat  Equation (2)

The above-cited equations become as follows in the case of FIG. 10 described above:

(odd-numbered array of rectangular images) odd line
address=(current_line-1)×32+[(current_rect-1)% 2]×16+Int[(current_rect-1)/2×4+current_beat (even-numbered array of rectangular images) odd line
address=(current_line-1)×4+(current rect-1)×16+0+current_beat (2) Read-Out Mode:

(odd-numbered array of rectangular images) odd line
address=(rcurrent_block-1)×1536+[(current_block-1)% 8]×192+Int[(current_block-1)/8]×6+current_beat  Equation (3)

(even-numbered array of rectangular images) even line address=(rcurrent_line-1)×6+(current_block-1)×192+0+current_beat  Equation (4)

It should be noted that in the equations cited above, "(current_rect-1)% 8" represents the remainder obtained when (current_rect-1) is divided by "8". Further, (current_block-1) is the number of lines constituting one rectangular image. Furthermore, Int[(current_block-1)/8] represents the integral part of the quotient obtained when (current_block-1) is divided by 8.

Further, current_rect in the write mode indicates the order (which starts at 1) of rectangular images in one array of rectangular images, and current_block at the time of read-out indicates the number of blocks, in which one block is composed of 32 pixels. Further, current_beat adopts as the offset the number of memory addresses in the line memory 210 necessary in order to input 32 pixels. Further, rcurrent_line indicates line position (any position from 1 to 32) at the time of read-out.

Further, the number "8" of rectangular images written to one line is the number of rectangular images in a case where each rectangular image has been stored in the line buffer in the manner illustrated in FIG. 12 and is obtained from 8192/1024 (32 pixels×32 lines).

Thus, if the line of the present rectangular image and the position of the rectangular image in one array of rectangular images are known, the read or write address of the line memory can be generated.

Next, the operation of the access arbitration unit 1630 will be described with reference to FIG. 19.

Figure 19:
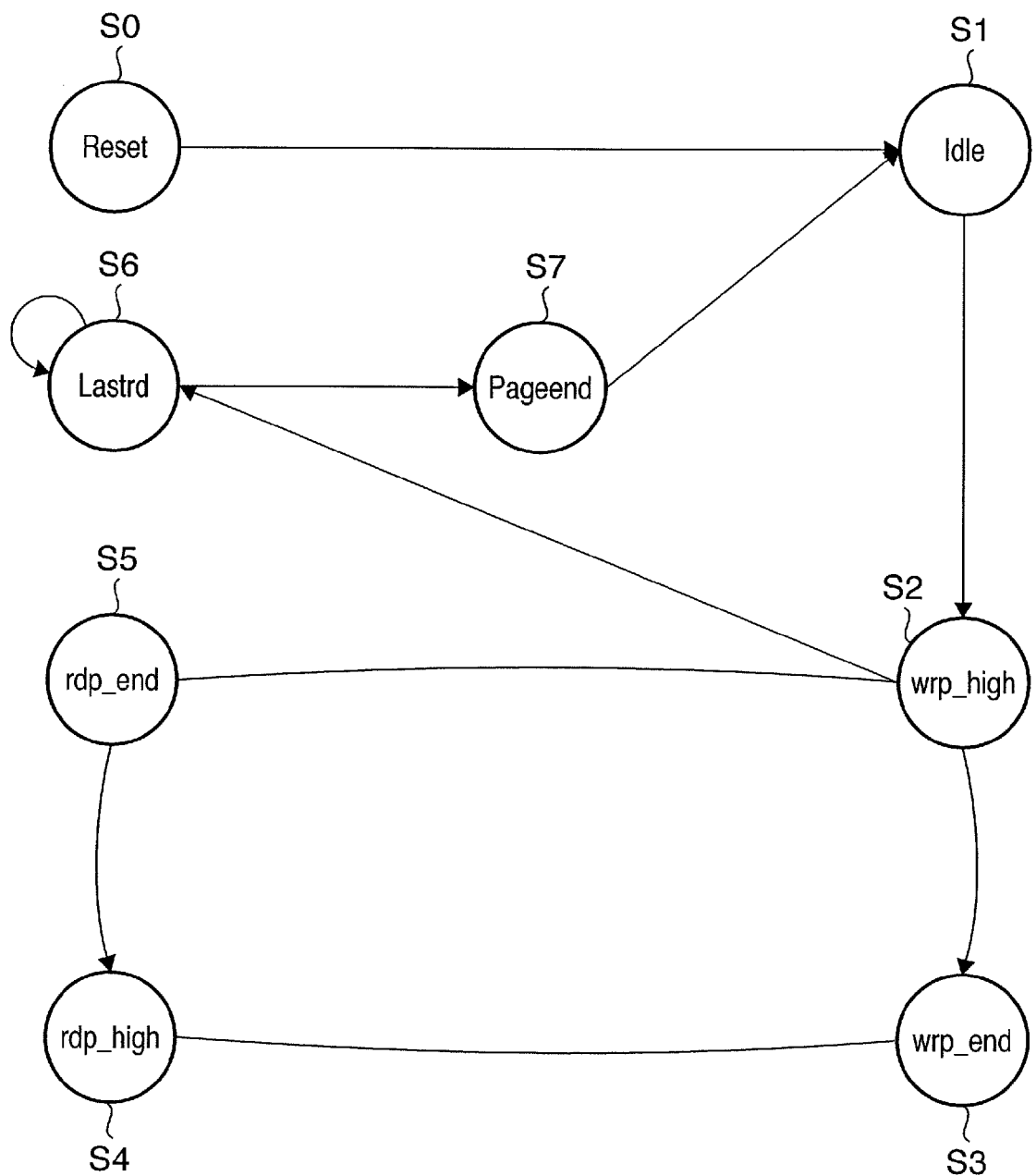
FIG. 19 is a diagram useful in describing a state transition controlled by an access arbitration unit according to this embodiment.

FIG. 19 is a diagram useful in describing a state transition controlled by the access arbitration unit 1630 according to this embodiment.

Here eight states (S0 to S7) have been defined in order to execute the processing of a certain page. The three main states are write-access priority high (S2), read priority high (S4) and final rectangular image array read (S6). State S0 indicates a reset state, and state S1 indicates an idle (standby) state. State S3 indicates a state in which writing of predetermined rectangular image data has ended, and state S5 indicates a state in which read-out of one main-scan line of image data has ended.

If there is a write request (write access) in state S2, write operation is executed preferentially. It should be noted that in accordance with the number of rectangular images written so far, there are two cases with regard to a read request (read access), namely a case where the read request is permitted and a case where the read request is not permitted and the system waits.

A read request is given priority in state S4. With regard to a write request, the writing of eight rectangular images is permitted when one line of data in the main-scan direction is read out in the example of FIG. 17. However, a data-write request continues to be denied until this one line of data is read out.

Only a read request is executed in state S6, which is the last state. This is a state in which the data of the final two arrays of rectangular images of the page has already been stored in the line memory 210. Even if there is a write request for the next page, the writing of the image data of the next page is not permitted until the image data of the current page is completed read out and output. A transition is made to state S7 if the image data of the current page is thus read out in its entirety.

In accordance with these control methods, it will suffice if the capacity of the line memory equivalent to (number of lines forming a rectangular image)×(number of pixels on one line). Image data in page units can be output upon being converted to image data in line units by two types of addressing methods in each of data write and data read-out.

This example assumes an arrangement having a line memory within an integrated circuit, as in the system shown in FIG. 1. However, implementation is possible even using an area that is part of a large-scale memory such as a DRAM, and implementation by software also is possible rather than adopting hardware for this control.

Figure 20:
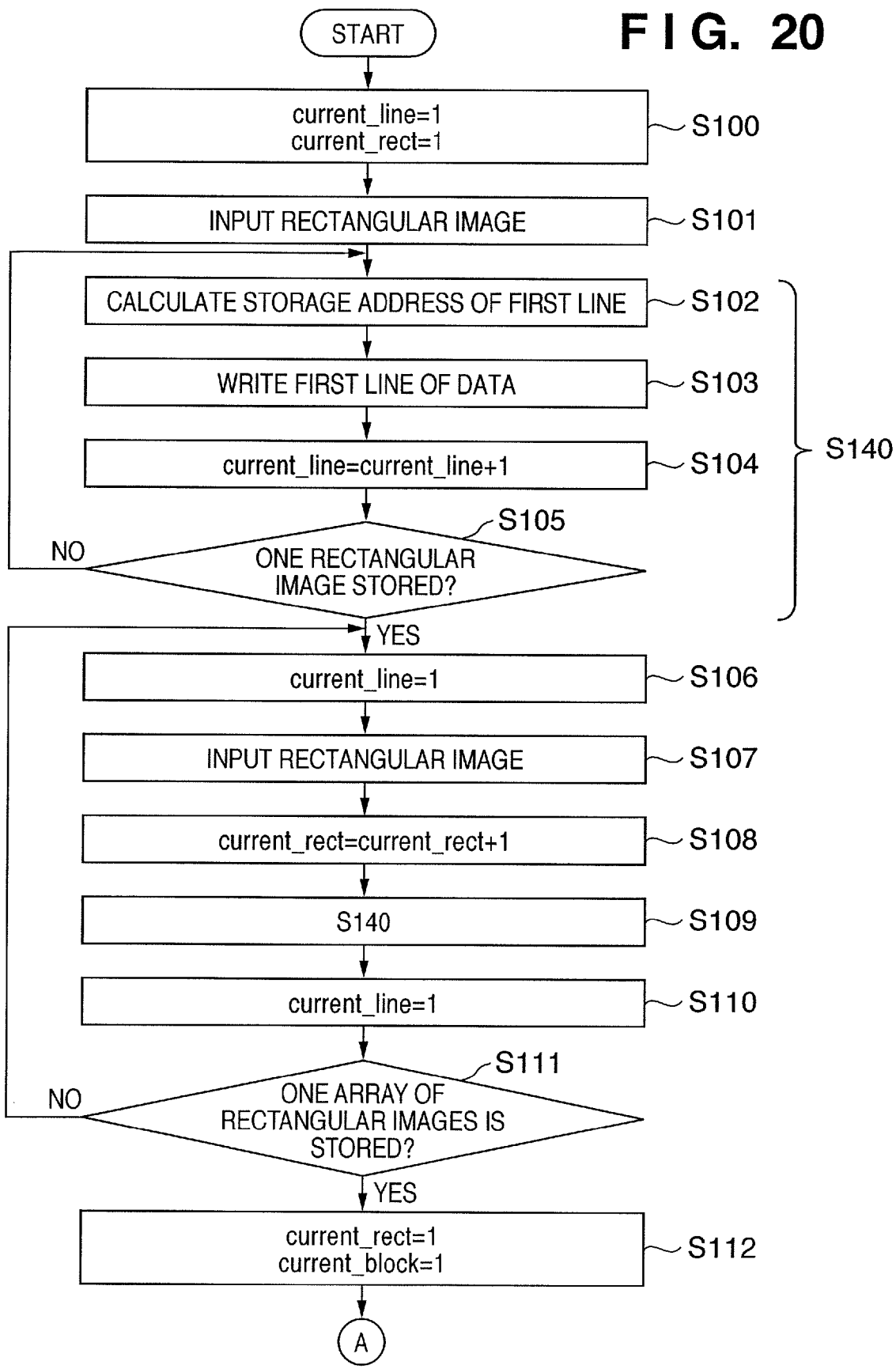
FIGS. 20 to 22 are flowcharts for describing data conversion processing by a controller according to this embodiment.
Figure 21:
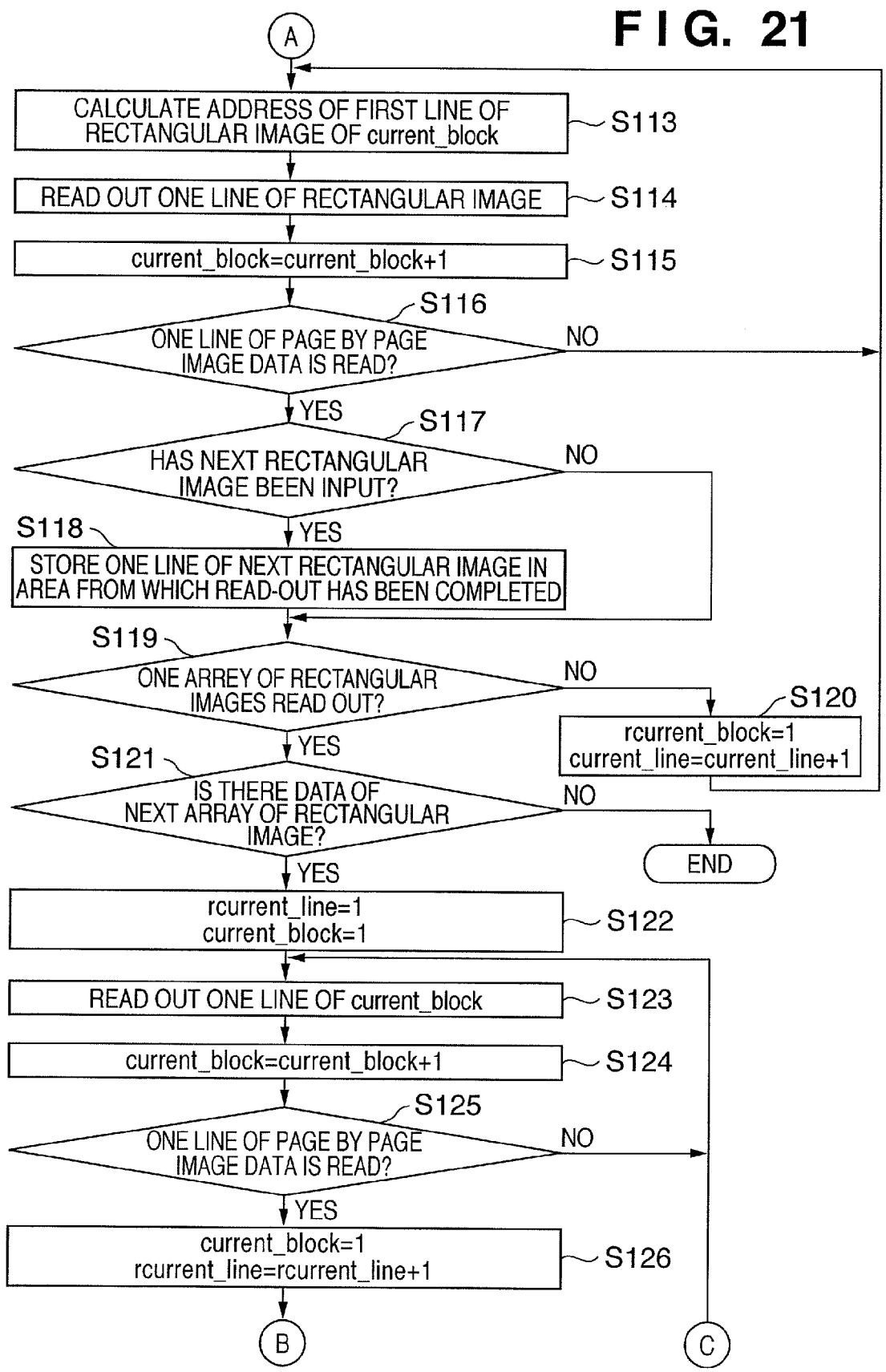
Figure 22:
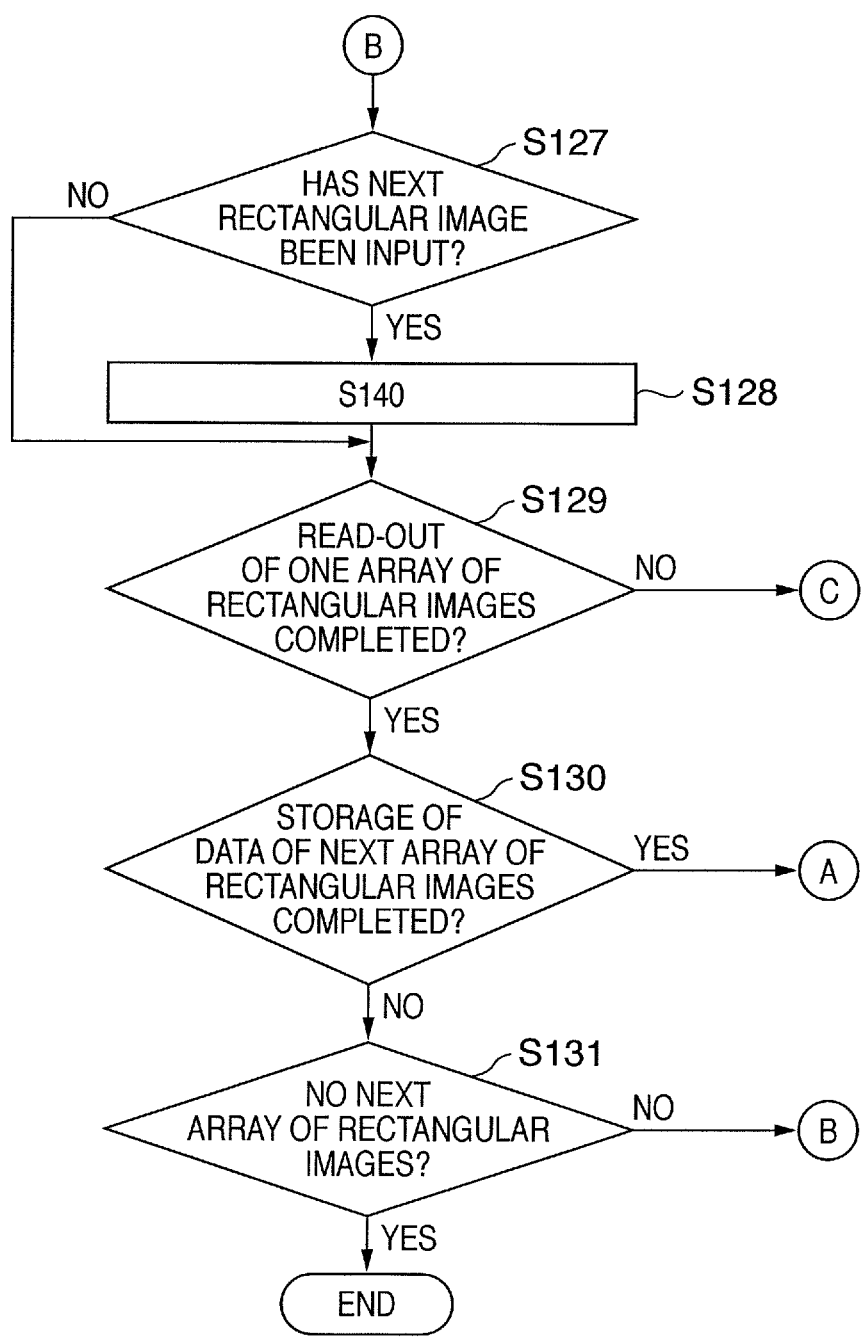

FIGS. 20 to 22 are flowcharts for describing data conversion processing executed by the controller 220 of FIG. 1.

Steps S100 to S112 in FIG. 20 indicate processing for inputting a plurality of rectangular images and storing the image data of one array of rectangular images in the line memory 210.

First, at step S100, current_line and current_rect are both initialized to "1". Next, the first rectangular image is input at step S101. The controller 220 generates the address that stores the first line of pixel data of this rectangular image at step S102 and writes the one line of pixel data of this rectangular image to this address at step S103. The generation of the address in this case is performed in accordance with Equation (1) cited above. When one line of pixel data of a rectangular image is written to the line memory 210 in this manner, the controller 220 increments current_line at step S104. It is determined at step S105 whether one rectangular image has been stored. The steps S102 to S105 are repeated until the writing of one rectangular image in the line memory 210 is determined at step S105. If the first rectangular image is thus written to the line memory 210, control proceeds to step S106 and current_line is restored to "1". The next rectangular image is input at step S107. Next, at step S108, current_rect, which indicates the order of the rectangular images, is incremented. At step S109, the controller 220 executes the processing of steps S102 to S105 (referred to collectively as a step S140) and writes this rectangular image to the line memory 210. If the writing of the second rectangular image to the line memory 210 is thus completed, control proceeds to step S110, where current_line is restored to "1". Control then proceeds to step S111. At step S111, the controller 220 determines whether the image data of one array of rectangular images has been stored in the line memory 210. If storage has been completed, control proceeds to step S112; otherwise, control returns to step S106. The state that results when image data of one array of rectangular images has thus been stored in the line memory 210 is that shown in FIG. 10, by way of example.

Next, with reference to FIG. 21, the image data of this one array of rectangular images is read out of the line memory 210 at steps S113 to S119. That is, at step S113, the controller calculates the address at which the first line (current block=1) of the first rectangular image has been stored. This can be found using Equation (3), for example, cited above. Next, at step S114, the controller 220 reads out one line of rectangular image and increments current_block at step S115. Whether one line (8192 pixels) of page-by-page image data has been read out is determined at step S116. The controller repeats steps S113 to S116 until one line (8192 pixels) of page-by-page image data is read out at step S116. If one line of page-by-page image data is thus read out, writing of the next rectangular image becomes possible. Therefore it is determined at step S117 whether the next rectangular image has been input and, if the rectangular image has been input, control proceeds to step S118. Here each line of the entered rectangular image is stored in an area equivalent to one line of the line memory 210 from which read-out has been completed (see FIG. 12). Calculation of the write address in this case is performed based upon Equation (2), by way of example. The state that results by thus writing the succeeding two rectangular images is as shown FIG. 12, by way of example.

If it is found at step S117 that the next rectangular image has not been input, or if step S118 has ended, control proceeds to step S119, where the controller determines whether read-out of the image data of one array of rectangular images has been completed. If read-out has not been completed, control proceeds to step S120, where current_block is restored to "1" and rcurrent_line is incremented, and then to step S113. The state that results when read-out of one array of rectangular images has been completed and the image data of the next array of rectangular images has been stored is as illustrated in FIG. 13, by way of example.

At step S121, the controller determines whether even a little of the image data of the next array of rectangular images has been stored. If absolutely no image data of the next array of rectangular images exists, then the controller judges that there will be no subsequent input of a rectangular image and terminates processing. It should be noted that this decision to terminate processing is not limited to that just described. That is, when the number of rectangular images that will be input is known in advance, the decision to terminate may be made based upon this number. Alternatively, when there is no input of image data upon elapse of a prescribed period of time, the decision to terminate may be made.

Read-out of the data of the second array of rectangular images is performed from step S122 onward.

The controller initializes both current_block and current_line to "1" at step S122, calculates the read-out address in accordance with, e.g., Equation (4) above and reads out the first line of the rectangular image of current_block at step S123 and increments current_block at step S124 to prepare for read-out of the first line of the rectangular image of current_block. When it is determined at step S125 that one line of page-by-page image data of the rectangular image has been read out, control proceeds to step S126. Here the controller sets current_block to "1", increments current_line and proceeds to read out the second line of image data of the rectangular image.

Since read-out of one line of page-by-page image data has been completed and writing of the next rectangular image has become possible, the controller determines at step S127 whether the next rectangular image has been input. If the next rectangular image has been input, control proceeds to step S128. Here, in the manner of the series of steps at S140, the rectangular image is stored in the image area of the first line from which read-out has already been performed. Next, at step S129, the controller determines whether read-out of the image data of one array of rectangular images, which was stored in the manner shown in, e.g., FIG. 13, has been completed. If read-out has not been completed, control returns to step S123. If read-out has been completed, on the other hand, then control proceeds to step S130 and the controller determines whether storage of the image data of the next array of rectangular images has been completed. If storage has been completed, then the image data will be stored as illustrated in, e.g., FIG. 10. In this case, control proceeds to step S113 and read-out of the image data of this array of rectangular images is performed. If storage has not been completed, then control proceeds to step S131. If absolutely no image data of the next array of rectangular images has been stored, the controller decides to terminate processing. This is identical with processing at step S121. On the other hand, if some image data has been stored, then the controller judges that image data of the next array of rectangular images has been input and control proceeds to step S127.

In order to facilitate understanding, the foregoing has been described using a single flowchart. However, it is possible to employ so-called multi-task processing, in which input of a rectangular image, writing of the image to the line memory and read-out of image data that has been stored in the line memory are executed as respective ones of separate tasks.

Further, since the above-cited equations for calculating addresses change depending upon the size of a rectangular image and the number of pixels of one line of page-by-page image data, these equations have been described as examples only and it goes without saying that the present invention is not limited by them.

For example, the rectangular image is composed of n×n pixels, in which n is an integer more than 2. In this case, the number of pixels in line-by-line of image data may be n×n×m, in which n and m are respectively integers more than 2.

In the above mentioned embodiment, writing of a rectangular image is started in response to read-out of one line of image data from the line buffer 210, but the present invention is not limited to the embodiment. For example, in a case that the rectangular image is composed of n×n pixels (n is an integer of more than 2), the writing of the rectangular image may be started in response to read-out of more than one line and less than n lines of image data from the line buffer 210. In this case, it is possible to reduce a time period for reading and writing from/to the line buffer, with comparison to a case that the writing of the rectangular image is started after read-out of n lines of image data from the line buffer 210.

Other Embodiments

Although an embodiment of the present invention has been described in detail, the present invention may be applied to a system constituted by a plurality of devices or to an apparatus comprising a single device.

The present invention can also be attained also by supplying a software program, which implements the functions of the foregoing embodiment, directly or remotely to a system or apparatus, reading the supplied program with a computer of the system or apparatus, and then executing the program. In this case, so long as the system or apparatus has the functions of the program, the mode of implementation need not be a program.

Accordingly, since the functional processing of the present invention is implemented by computer, the program codes per se installed in the computer also implement the present invention. In other words, the claims of the present invention also cover a computer program that is for the purpose of implementing the functional processing of the present invention. In this case, so long as the system or apparatus has the functions of the program, the form of the program, e.g., object code, a program executed by an interpreter or script data supplied to an operating system, etc., does not matter.

Various recording media can be used for supplying the program. Examples are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and a download can be made from the website to a recording medium such as a hard disk. In this case, what is downloaded may be the computer program per se of the present invention or a compressed file that contains automatically installable functions. Further, implementation is possible by dividing the program codes constituting the program of the present invention into a plurality of files and downloading the files from different websites. In other words, a WWW (World Wide Web) server that downloads, to multiple users, the program files that implement the functional processing of the present invention by computer also is covered by the scope of the present invention.

Further, it is also possible to encrypt and store the program of the present invention on a storage medium such as a CD-ROM and distribute the storage medium to users. In this case, users who meet certain requirements are allowed to download decryption key information from a website via the Internet, and the program decrypted using this key information is installed on a computer in executable form.

Further, implementation of the functions is possible also in a form other than one in which the functions of the foregoing embodiment are implemented by having a computer execute a program that has been read. For example, based upon indications in the program, an operating system or the like running on the computer may perform all or a part of the actual processing so that the functions of the foregoing embodiments can be implemented by this processing.

Furthermore, it may be so arranged that a program that has been read from a recording medium is written to a memory provided on a function expansion board inserted into the computer or provided in a function expansion unit connected to the computer. In this case, a CPU or the like provided on the function expansion board or function expansion unit performs some or all of the actual processing based upon the indications in the program and the functions of the foregoing embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-275730, filed Oct. 6, 2006, which is hereby incorporated by reference herein in its entirety.

What is claimed is:

1. An image processing apparatus for inputting m rectangular images each composed of n×n pixels, where n is an integer greater than 1, and outputting n lines of image data each composed of n×m pixels, where m is an integer greater than 1, comprising: a storage unit having n×m addresses in a first direction and having n addresses in a second direction perpendicular to the first direction; and a control unit configured to write image data of the m rectangular images into said storage unit using a first writing method and to read out the n lines of image data from said storage unit using a first reading method, and to write image data of the m rectangular images into said storage unit using a second writing method and to read out the n lines of image data from said storage unit using a second reading method, wherein the first writing method is a method in which each rectangular image is written into said storage unit such that, for each of the rectangular images, the pixels included in that rectangular image are stored in said storage unit so as to occupy a two-dimensional set of pixels corresponding to the shape of the rectangular image, a (k+1)th rectangular image, where k is an integer greater than or equal to 1, is stored in an address shifted n x n pixels in the first direction from a k-th rectangular image, where k is an integer greater than or equal to 1, and a (k+2)th rectangular image, where k is an integer greater than or equal to 1, is stored in an address shifted n pixels in the first direction from the k-th rectangular image, wherein the first reading method is a method in which each line of image data is read out from said storage unit such that m sets of n pixels are read out from m sequences of addresses of n pixels in the first direction of said storage unit, a (k+1)th set, where k is an integer greater than or equal to 1, is read out from an address shifted n x n pixels in the first direction from a k-th set, where k is an integer greater than or equal to 1, and a (k2)th set, where k is an integer greater than or equal to 1, is read out from an address shifted n pixels in the first direction from the k-th set, wherein the second writing method is a method in which each rectangular image is written into said storage unit such that for each of the rectangular images, the pixels included in that rectangular image are stored in a continuous sequence of addresses of n×n pixels in the first direction of said storage unit, a (k+1)th rectangular image, where k is an integer greater than or equal to 1, is stored in an address shifted n x n pixels in the first direction from a k-th rectangular image, where k is an integer greater than or equal to 1, and a (k+2)th rectangular image, where k is an integer greater than or equal to 1, is stored in an address shifted one pixel in the second direction from the k-th rectangular image, and wherein the second reading method is a method in which each line of image data is read out from said storage unit such that m sets of n pixels are read out from m sequences of addresses of n pixels in the first direction of said storage unit, a (k+1)th set, where k is an integer greater than or equal to 1, is read out from an address shifted n×n pixels in the first direction from a k-th set, where k is an integer greater than or equal to 1, and a (k+2)th set, where k is an integer greater than or equal to 1, is read out from an address shifted one pixel in the second direction from the k-th set.

2. The apparatus according to claim 1, wherein said control unit starts writing of a rectangular image into said storage unit in response to reading out of one line of image data from said storage unit.

3. The apparatus according to claim 1, wherein said control unit stores a rectangular image in an area of said storage unit where said control unit has read out the one line of image data.

4. A non-transitory computer readable storage medium storing a program for causing a computer to function as the image processing apparatus defined in claim 1.

5. An image processing method in an image processing apparatus having a storage unit having n×m addresses, where n and m are integers greater than 1, in a first direction and having n addresses in a second direction perpendicular to the first direction, for inputting m rectangular images each composed of n×n pixels and outputting n lines of image data each composed of n×m pixels, the method comprising: writing image data of the m rectangular images into the storage unit in a first writing method and reading out the n lines of image data from the storage unit in a first reading method; and writing image data of the m rectangular images into the storage unit in a second writing method and reading out the n lines of image data from the storage unit in a second reading method, wherein the first writing method is a method in which each rectangular image is written into said storage unit such that, for each of the rectangular images, the pixels included in that rectangular image are stored in said storage unit so as to occupy a two- dimensional set of pixels corresponding to the shape of the rectangular image, a (k+1)th rectangular image, where k is an integer greater than or equal to 1, is stored in an address shifted n×n pixels in the first direction from a k-th rectangular image, where k is an integer greater than or equal to 1, and a (k+2)th rectangular image, where k is an integer greater than or equal to 1, is stored in an address shifted n pixels in the first direction from the k-th rectangular image, wherein the first reading method is a method, in which each line of image data is read out from the storage unit such that m sets of n pixels are read out from m sequences of addresses of n pixels in the first direction of the storage unit, a (k+1)th set, where k is an integer greater than or equal to 1, is read out from an address shifted n×n pixels in the first direction from the k-th set, where k is an integer greater than or equal to 1, and a (k+2)th set, where k is an integer greater than or equal to 1, is read out from an address shifted n pixels in the first direction from the k-th set, wherein the second writing method is a method, in which each rectangular image is written into the storage unit such that pixels included in the rectangular image are stored in a continuous sequence of addresses of n×n pixels in the first direction of the storage unit, a (k+1)th rectangular image, where k is an integer greater than or equal to 1, is stored in an address shifted n×n pixels in the first direction from a k-th rectangular image, and a (k+2)th rectangular image, where k is an integer greater than or equal to 1, is stored in an address shifted one pixel in the second direction from the k-th rectangular image, and wherein the second reading method is a method, in which each line of image data is read out from the storage unit such that m sets of n pixels are read out from m sequences of addresses of n pixels in the first direction of the storage unit, a (k+1)th set, where k is an integer greater than or equal to 1, is read out from an address shifted n x n pixels in the first direction from a k-th set, and a (k+2)th set, where k is an integer greater than or equal to 1, is read out from an address shifted one pixel in the second direction from the k-th set.

* * * * *